US011175967B2

(12) United States Patent
Gogate et al.

(10) Patent No.: US 11,175,967 B2
(45) Date of Patent: Nov. 16, 2021

(54) INTELLIGENT CONTEXTUAL GROUPING OF NOTIFICATIONS IN AN ACTIVITY FEED

(71) Applicant: Citrix Systems, Inc., Fort Lauderdale, FL (US)

(72) Inventors: Anuja Gogate, Chapel Hill, NC (US); Dustin Norman, Apex, NC (US); Shawn Hoerner, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 96 days.

(21) Appl. No.: 16/718,285

(22) Filed: Dec. 18, 2019

(65) Prior Publication Data

US 2021/0191790 A1 Jun. 24, 2021

(51) Int. Cl.
*G06F 9/54* (2006.01)
*G06N 20/00* (2019.01)
*G06F 3/0482* (2013.01)
*G06F 21/31* (2013.01)
*G06K 9/62* (2006.01)

(52) U.S. Cl.
CPC ............ *G06F 9/542* (2013.01); *G06F 3/0482* (2013.01); *G06F 21/31* (2013.01); *G06K 9/6202* (2013.01); *G06K 9/6218* (2013.01); *G06N 20/00* (2019.01)

(58) Field of Classification Search
CPC ........ G06F 9/542; G06F 21/31; G06F 3/0482; G06K 9/6218; G06N 20/00
See application file for complete search history.

(56) References Cited

U.S. PATENT DOCUMENTS

| | | | |
|---|---|---|---|
| 2006/0195461 A1* | 8/2006 | Lo | G06F 16/93 |
| 2007/0198677 A1 | 8/2007 | Ozhan et al. | |
| 2012/0290740 A1 | 11/2012 | Tewari et al. | |
| 2013/0268839 A1* | 10/2013 | Lefebvre | G06Q 10/107 715/234 |
| 2015/0261774 A1 | 11/2015 | McFerrin et al. | |

(Continued)

OTHER PUBLICATIONS

Manish Mattal, "Exciting advances in Azure Alerts—From better alert management to Smart Groups" (Jun. 13, 2018), pp. 1-6 [retrieved from https://azure.microsoft.com/en-us/blog/exciting-advances-in-azure-alerts-from-better-alert-management-to-smart-groups/].*

(Continued)

*Primary Examiner* — Brian W Wathen
(74) *Attorney, Agent, or Firm* — Pierce Atwood LLP

(57) ABSTRACT

A system determines that resource activity notifications, including at least a first notification and a second notification, are to be sent to a client device operated by a user. The first notification includes a first user interface element, and the second notification includes a second user interface element. The system determines, based on content of the resource activity notifications, that a subset of the resource activity notifications are contextually related, the subset including at least the first notification and the second notification. The system provides the first subset of the resource activity notifications to the client device as a first group, thus enabling the user to operate a user interface of the client device to select the first user interface element to take a first action and to select the second user interface element to take a second action.

24 Claims, 14 Drawing Sheets

(56) References Cited

U.S. PATENT DOCUMENTS

2017/0126609 A1* 5/2017 Sharifi .................... G06F 9/451
2020/0374356 A1* 11/2020 Bejar ..................... G06F 40/40

OTHER PUBLICATIONS

Invitation to Pay Additional Fees and Communication Relating to the Results of the Partial International Search, dated Feb. 26, 2021 for International Patent Application No. PCT/US2020/060394.
International Search Report and Written Opinion dated Apr. 14, 2021 for International Patent Application No. PCT/US2020/060394.

* cited by examiner

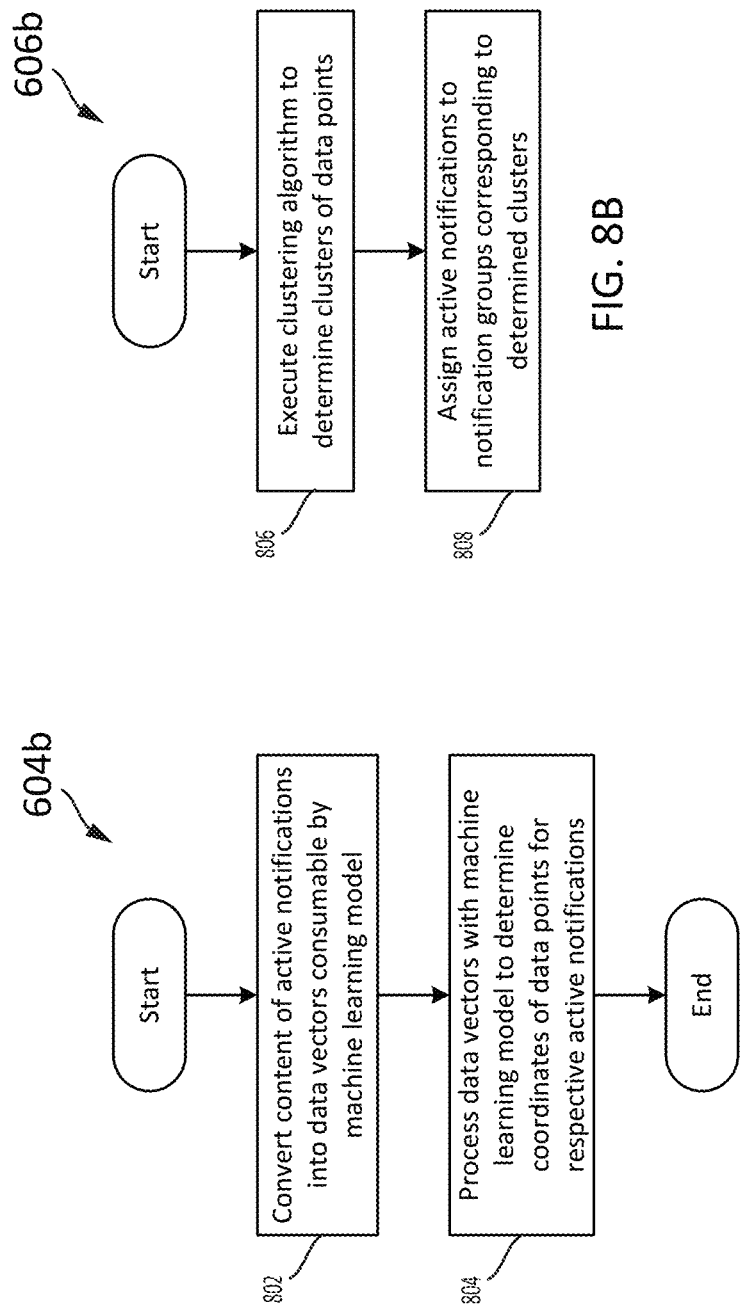

_INTELLIGENT CONTEXTUAL GROUPING OF NOTIFICATIONS IN AN ACTIVITY FEED_

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is an intelligent activity feed for a user's many applications. Such an activity feed provides a streamlined mechanism for notifying a user of various application events in need of attention and allowing the user to efficiently act on such events, without requiring the user to switch context and separately launch the respective applications to take actions with respect to the different events.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining, by a computing system, that resource activity notifications are to be sent to a client device operated by a user, the resource activity notifications including at least a first notification and a second notification, the first notification including a first user interface element corresponding to a first action to be taken with respect to a first resource, and the second notification including a second user interface element corresponding to a second action to be taken with respect to a second resource, the second resource being different than the first resource; determining, by the computing system and based on content of the resource activity notifications, that a first subset of the resource activity notifications are contextually related, the first subset including at least the first notification and the second notification; and providing, by the computing system, the first subset of the resource activity notifications to the client device as a first group, the provision of the first subset of the resource activity notifications enabling the user to operate a user interface of the client device to select the first user interface element to take the first action and to select the second user interface element to take the second action.

In some disclosed embodiments, a system comprises at least one processor, and at least one computer-readable medium. The at least one computer-readable medium is encoded with instructions which, when executed by the at least one processor, cause the computing system to determine that resource activity notifications are to be sent to a client device operated by a user, the resource activity notifications including at least a first notification and a second notification, the first notification including a first user interface element corresponding to a first action to be taken with respect to a first resource, and the second notification including a second user interface element corresponding to a second action to be taken with respect to a second resource, the second resource being different than the first resource, to determine, based on content of the resource activity notifications, that a first subset of the resource activity notifications are contextually related, the first subset including at least the first notification and the second notification, and to provide the first subset of the resource activity notifications to the client device as a first group, the provision of the first subset of the resource activity notifications enabling the user to operate a user interface of the client device to select the first user interface element to take the first action and to select the second user interface element to take the second action.

In some disclosed embodiments, at least one non-transitory computer-readable medium is encoded with instructions which, when executed by at least one processor included in a computing system, cause the computing system to determine that resource activity notifications are to be sent to a client device operated by a user, the resource activity notifications including at least a first notification and a second notification, the first notification including a first user interface element corresponding to a first action to be taken with respect to a first resource, and the second notification including a second user interface element corresponding to a second action to be taken with respect to a second resource, the second resource being different than the first resource, to determine, based on content of the resource activity notifications, that a first subset of the resource activity notifications are contextually related, the first subset including at least the first notification and the second notification, and to provide the first subset of the resource activity notifications to the client device as a first group, the provision of the first subset of the resource activity notifications enabling the user to operate a user interface of the client device to select the first user interface element to take the first action and to select the second user interface element to take the second action.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 8A is a flow chart showing a second example implementations of one of the steps of the routine shown in FIG. 6;

FIG. 8B is a flow chart showing a second example implementations of another of the steps of the routine shown in FIG. 6.

DETAILED DESCRIPTION

For purposes of reading the description of the various embodiments below, the following descriptions of the sections of the specification and their respective contents may be helpful:

Section A provides an introduction to example embodiments of systems for providing intelligent contextual grouping of notifications in an activity feed;

Section B describes a network environment and computing environment which may be useful for practicing embodiments described herein;

Section C describes embodiments of systems and methods for delivering shared resources using a cloud computing environment;

Section D describes embodiments of systems and methods for managing and streamlining access by clients to a variety of resources;

Section E provides a detailed description of example embodiments of systems for providing intelligent contextual grouping of notifications in an activity feed; and Section F describes example implementations of methods, systems/devices, and computer-readable media in accordance with the present disclosure.

Figure 1A:
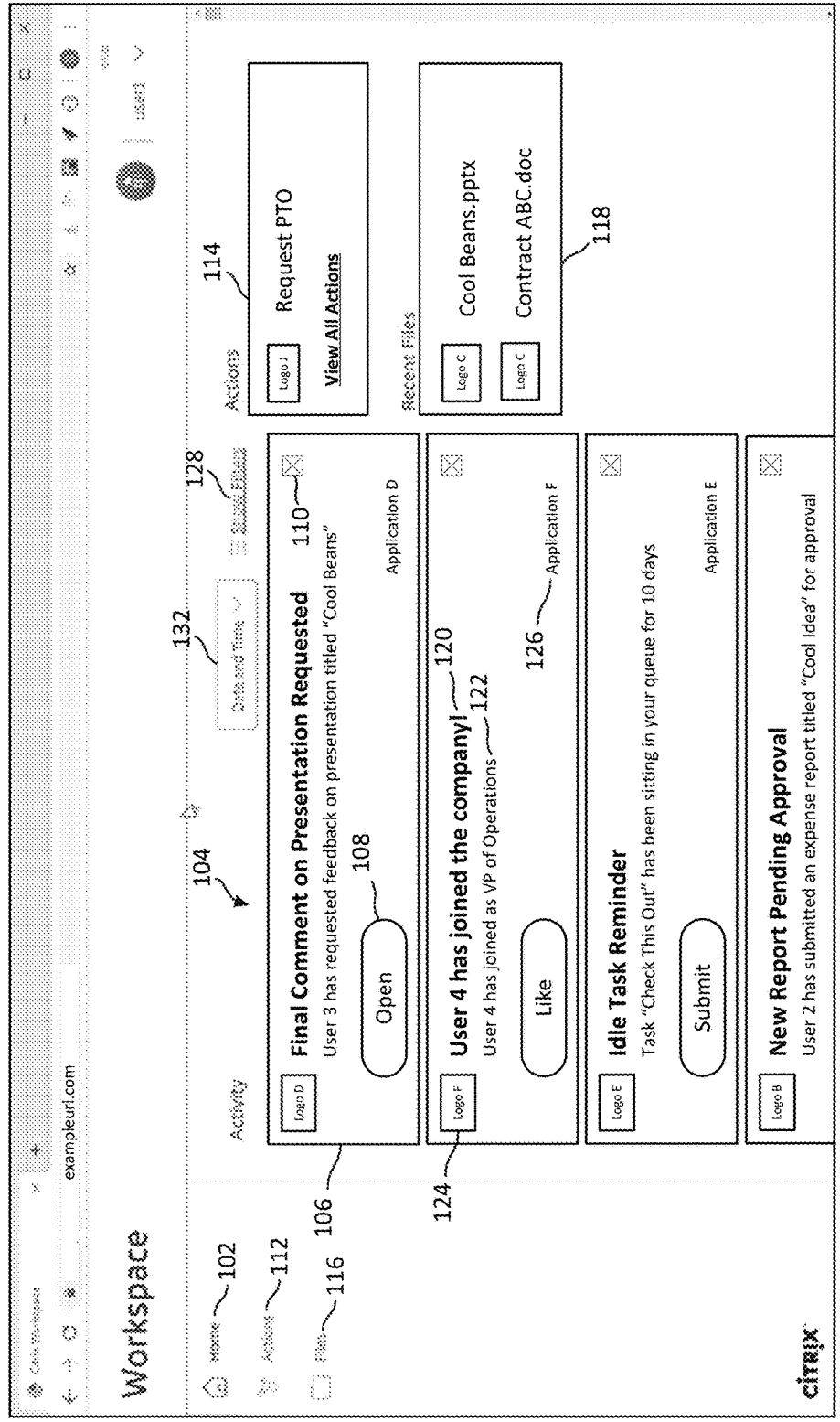
FIG. 1A shows how a display screen may appear when an intelligent activity feed feature of a multi-resource management system, such as Citrix Workspace™, is employed.

A. Introduction to Illustrative Embodiments of a System for Providing Intelligent Contextual Grouping of Notifications in an Activity Feed FIG. 1A shows how a display screen 100 of a multi-resource access system, such as Citrix Workspace™, may appear when an intelligent activity feed feature is employed and a user is logged on to the system. Such a screen may be provided, for example, when the user clicks on or otherwise selects a "home" user interface element 102. As shown, an activity feed 104 may be presented on the screen 100 that includes a plurality of notifications 106 about respective events that occurred within various applications to which the user has access rights. An example implementation of a system capable of providing an activity feed 104 like that shown is described in Section D below in connection with FIG. 4C. As Section D explains, a user's authentication credentials may be used to gain access to various systems of record (e.g., SalesForce, Ariba, Concur, RightSignature, etc.) with which the user has accounts, and events that occur within such systems of record may be evaluated to generate notifications 106 to the user concerning actions that the user can take relating to such events. As shown in FIG. 1A, in some implementations, the notifications 106 may include a title 120 and a body 122, and may also include a logo 124 and/or a name 126 of the system or record to which the notification 106 corresponds, thus helping the user understand the proper context with which to decide how best to respond to the notification 106. In some implementations, one of more filters may be used to control the types, date ranges, etc., of the notifications 106 that are presented in the activity feed 104. The filters that can be used for this purpose may be revealed, for example, by clicking on or otherwise selecting the "show filters" user interface element 128.

When presented with such an activity feed 104, the user may respond to the notifications 106 by clicking on or otherwise selecting a corresponding action element 108 (e.g., "Approve," "Reject," "Open," "Like," "Submit," etc.), or else by dismissing the notification, e.g., by clicking on or otherwise selecting a "close" element 110. As explained in connection with FIG. 4C below, the notifications 106 and corresponding action elements 108 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 106 (e.g., in a separate, pop-up window corresponding to the microapp) by clicking on or otherwise selecting a portion of the notification 106 other than one of the user-interface elements 108, 110. In some embodiments, the user may additionally or alternatively be able to select a user interface element either within the notification 106 or within a separate window corresponding to the microapp that allows the user to launch the native application to which the notification relates and respond to the event that prompted the notification via that native application rather than via the microapp. In addition to the event-driven actions accessible via the action elements 108 in the notifications 106, a user may alternatively initiate microapp actions by selecting a desired action, e.g., via a drop-down menu accessible using the "action" user-interface element 112 or by selecting a desired action from a list 114 of recently and/or commonly used microapp actions. As shown, the user may also access files (e.g., via a Citrix ShareFile™ platform) by selecting a desired file, e.g., via a drop-down menu accessible using the "files" user interface element 116 or by selecting a desired file from a list 118 of recently and/or commonly used files.

Although not shown in FIG. 1A, it should be appreciated that, in some implementations, additional resources may also be accessed through the screen 100 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 1A provides significant benefits, as it allows a user to respond to application-specific events generated by disparate systems of record without needing to navigate to, launch, and interface with multiple different native applications. The inventors have recognized and appreciated, however, that a user may still need to cognitively switch context when reviewing a sequence of notifications in the activity feed 104. To illustrate this difficulty with an example, suppose an employee comes back from a business trip and files air and hotel expenses in Concur, inputs details about the prospect in Salesforce, and sends out a contract to sign through RightSignature. When the employee's manager later logs on to Citrix Workspace™ and selects to view the activity feed 104, the manager would be presented with a different notification 106 concerning each such activity. How these notifications 106 show up chronologically in the activity feed 104, however, would depend on the order in which the employee entered them into the respective applications, the amount of time that elapsed between the respective entries, and/or the timing and number of other, unrelated notifications 106 that are generated for the manager. Accordingly, the notifications 106 relating to the employee's business trip may be interleaved among a number of notifications relating to different, unrelated subjects. Hence, the manager faces the problem of having to constantly context switch between unrelated subjects when sequentially reviewing notifications 106.

Offered is a service that can examine aggregated notifications to identify subsets of those notifications 106 that are contextually related, such as being related to the same business trip by an employee, and present such subsets of contextually related notifications as coherent groups in an activity feed 104. A user can thus be presented with groups of contextually related notifications, rather than a sequence of individual notifications 106 that may or may not be related, and thereby minimize the amount cognitive contextual switching the user needs to engage in when reviewing and taking actions with respect to the activity feed 104. Notifications 106 can thus be delivered to the user in a fashion that helps the user efficiently take action on contextually related notifications, regardless of the source.

As explained in more detail, in some embodiments, groups of contextually related notifications may be identified using clustering techniques. In some embodiments, for example, groups of contextually related notifications may be ascertained simply by evaluating the degree of similarity between word strings in respective notifications and assigning notifications to contextual groups based on such similarity values.

In some embodiments, the content of notifications may additionally or alternatively be converted into data vectors that are input to a machine learning model and data points output by the model may be evaluated using one or more clustering techniques to identify clusters. In some embodiments, such a machine learning model may be optimized based on users' interactions with the groupings of notifications that are presented, for example, when users "ungroup" notification groups or selectively add or remove one or more notifications to or from a group. In some embodiments, a time-based heuristic may additionally be employed when identifying clusters and/or when using a machine learning model to identify data points to be clustered, for example, to favor the grouping of notifications that are generated close to one another in time. Additional details concerning the foregoing approaches are provided below in Section E.

Figure 1B:
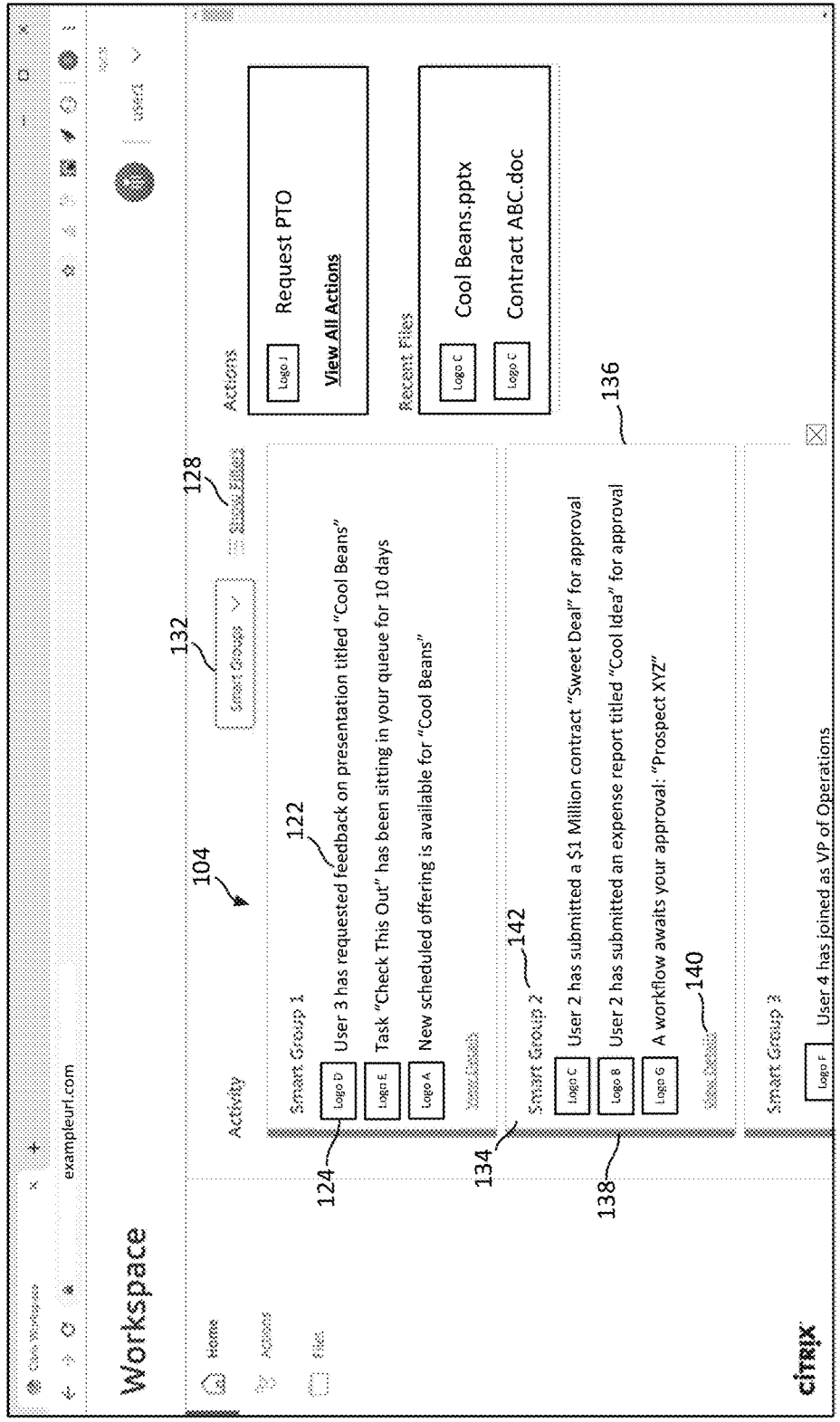
FIG. 1B shows an example of how a display screen may appear when a user selects a "smart groups" option for an intelligent activity feed feature as disclosed herein.

FIG. 1B shows an example screen 130 may be presented when a user has opted to view groups of contextually related notifications rather than a stream of notifications sorted by the time and date they were generated. As FIG. 1B illustrates, in some embodiments, such a "smart group" mode of presentation may be selected by manipulating a user interface element 132 to indicate such a selection, rather than a "date and time" mode (as shown for the element 132 in FIG. 1A) or an "application" mode (not illustrated) in which notifications are sorted by application type.

As shown in FIG. 1B, in some embodiments, respective notification groups 134 may be initially presented in a compact fashion, so that several notifications groups 134 may be presented concurrently on the screen 130. In the illustrated example, only the bodies 122 and the logos 124 of the notifications 106 are presented within the notification groups 134. In some embodiments, the title 120 may be presented in addition to or in lieu of the body 122. Additionally or alternatively, the titles 120 and/or the bodies 122 of the notifications 106 may be abbreviated, e.g., to include only the first several words followed by ellipses, within the notification groups 134. The notification groups 134 may be differentiated from one another in any of a number of ways. In some embodiments, for example, the notification groups 134 may be presented within different regions of the screen and one or more graphical elements may be presented on the screen 130 to indicate the separate groupings. In illustrated example, the respective notification groups 134 are surrounded by rectangular graphical elements 136 and are marked on one side by vertical bars 138. In some embodiments, the vertical bars 138 for respective notification groups 134 may be different colors or otherwise be differentiable to create a further visual distinction between the different groups. Further, in some implementations, vertical bars 138 of particular colors, e.g., red, yellow, or green, may serve to signify a particular priority or logical classification of the notification groups 134. For example, notification groups 134 that include highly time-sensitive notifications 106 may have red vertical bars 138, notification groups 134 that include somewhat time-sensitive notifications 106 may have yellow vertical bars 138, and notification groups 134 that include only informational notifications 106 may have green vertical bars 138. In some embodiments, one or more graphical elements may additionally or alternatively be positioned between pairs of the notification groups 134 to indicate the respective groupings.

As illustrated, in some embodiments, the notification groups 134 may additionally or alternatively be identified using different group titles 142 (e.g., "Smart Group 1," "Smart Group 2," etc.). In some implementations, such group titles may be determined dynamically based on the perceived contents of the notifications 106 in the respective notification groups 134, e.g., by identifying one or more common features of the titles 120 and/or the bodies 122 of such notifications 106. In some implementations, the group titles may additionally or alternatively be named and/or renamed based on user input provided via a user-interface, e.g., by right-clicking on a group title 142 and selecting "re-name group" from a drop down menu.

Figure 1C:
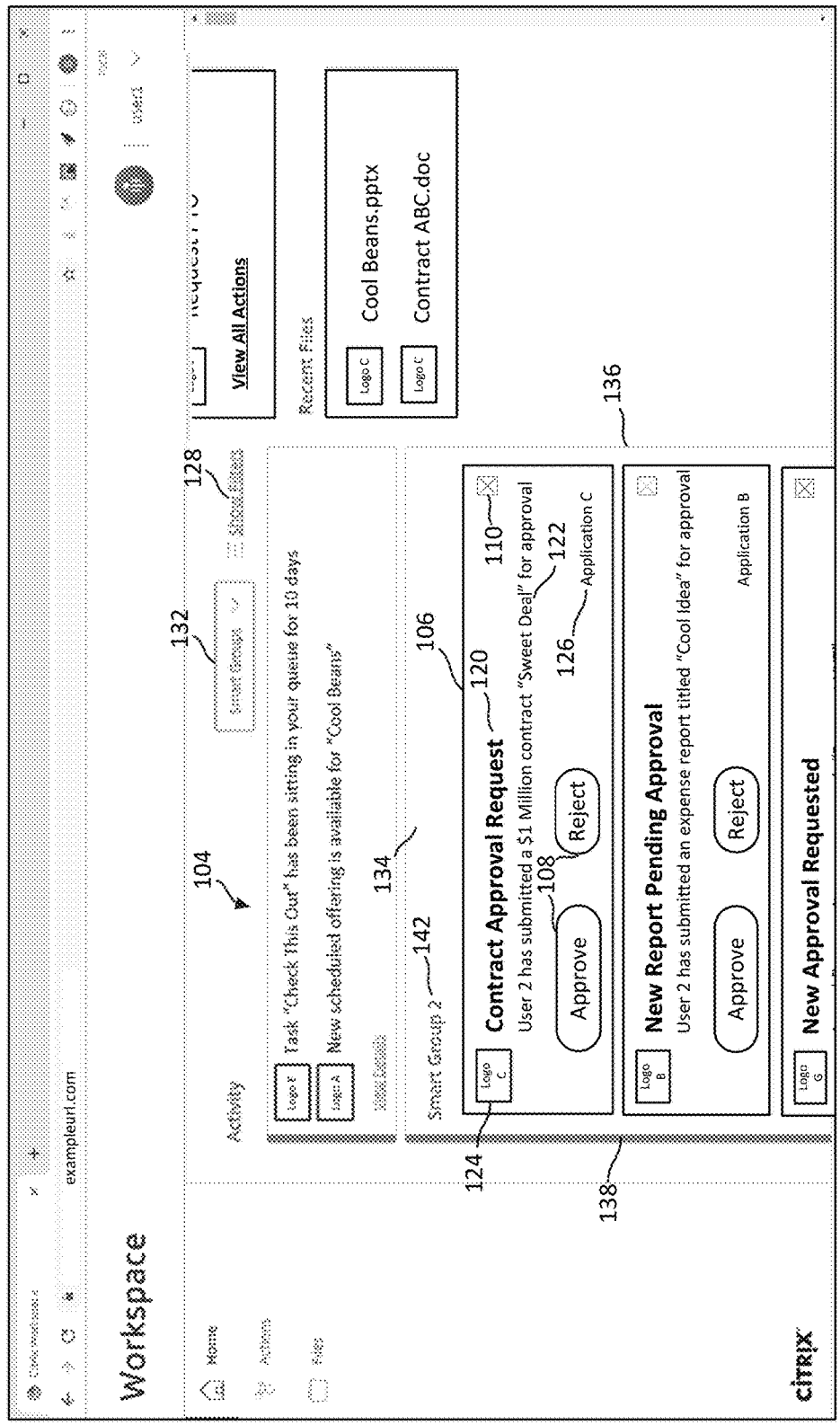
FIG. 1C shows an example of how a display screen may appear after a user selects a "view details" option from the display screen shown in FIG. 1B.

In some embodiments, a user may click on or otherwise select a "view details" user interface element 140 to view additional content of the notifications 106 within a particular notification group 134. FIG. 1C shows an example screen 150 that may be presented, for instance, when the user interface element 140 associated with "Smart Group 2" shown in FIG. 1B is selected. As shown in FIG. 1C, in addition to the abbreviated information presented in the compact version of "Smart Group 2" shown in FIG. 1B, i.e., the bodies 122 and the application logos 124 of the notifications 106, the expanded notification group 134 for "Smart Group 2" may additionally include the titles 120, the application names 126, one or more action elements 108 (e.g., to "Approve" or "Reject" a request), and user interface elements 110 to dismiss or close the notifications 106. As with the compact notification groups 134, the expanded notification groups 134 may be differentiated from the other notification groups using one or more graphical elements 136, 138.

Although not illustrated in FIGS. 1B-C, in some embodiments, one or more group-level action elements, e.g., selectable buttons or the like, may additionally or alternatively be associated with one or more of the notification groups 134 that are included in the activity feed 104. By selecting such a group level action element, a user may act upon all of the notifications 106 in the corresponding notification group 134 with a single click or other action. For example, with reference to FIG. 1C, in addition to or in lieu of the action elements 108 (i.e., "Approve" and "Reject") associated with the individual notifications 106, one or more group-level action elements (not shown may be provided that may allow a user to "Approve" or "Reject" all of the notifications in a particular notification group 134, or at least those notifications 106 in the group that include a corresponding notification-level "Approve" or "Reject" action element.

Presentation of groups of contextually related notifications 106 in this manner, rather than as a time-ordered stream of notifications 106 which may or may not be related, improves a user's ability to interact with the activity feed 104 and quickly take appropriate actions, e.g., using action elements 108, with respect to an entire group of notifications relating to a common subject. A user's ability to quickly resolve and respond to the respective notifications may thus be improved because the user need not take the time to switch cognitive contexts while the user is resolving the various notifications within the same notification group 134, e.g., a set of notifications that all relate to the same business trip by an employee.

Additional details and example implementations of embodiments of the present disclosure are set forth below in Section E, following a description of example systems and network environments in which such embodiments may be deployed.

B. Network and Computing Environment

Figure 2A:
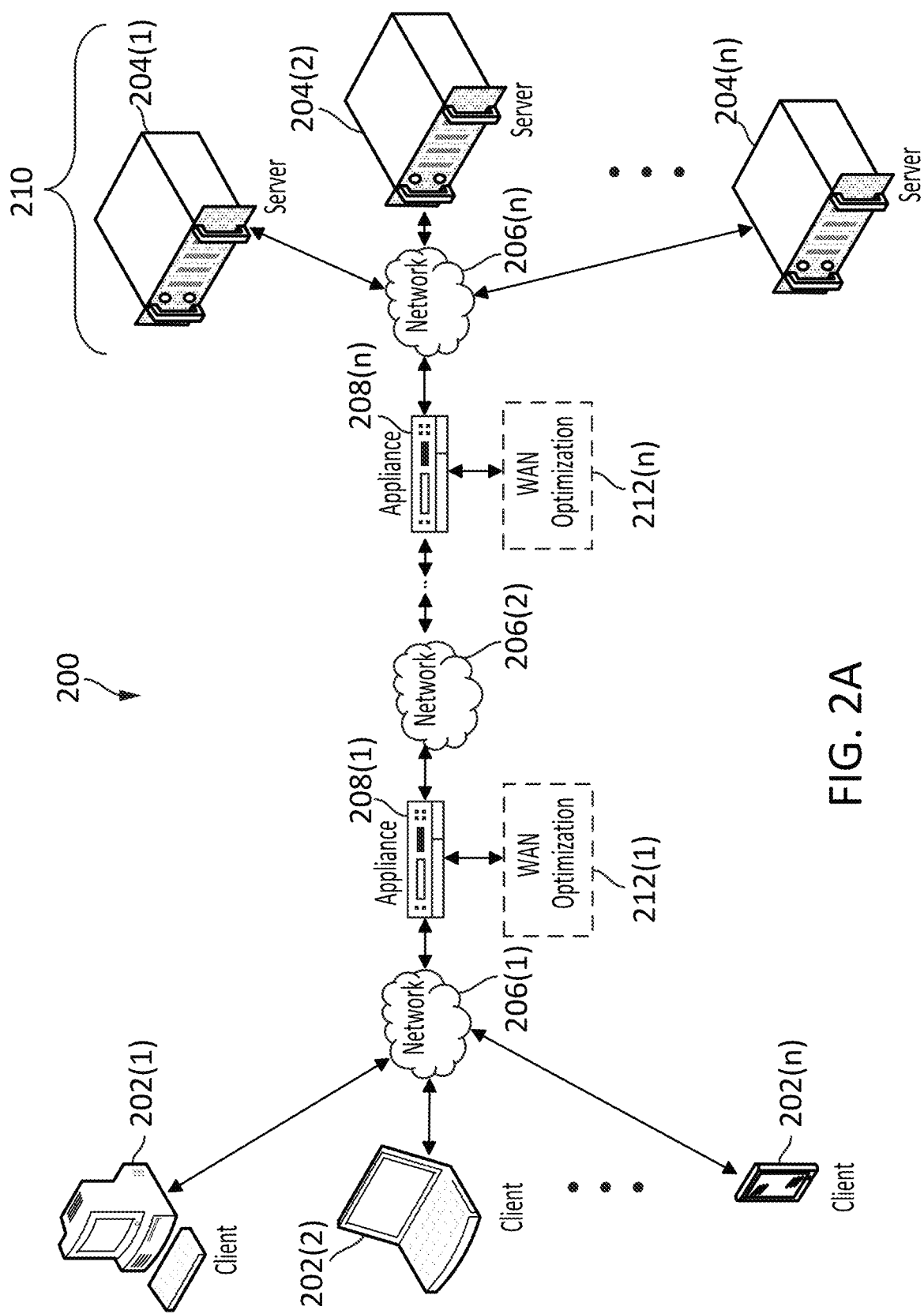
FIG. 2A is a diagram of a network computing environment in which some embodiments of the peripheral device sharing techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over interne protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
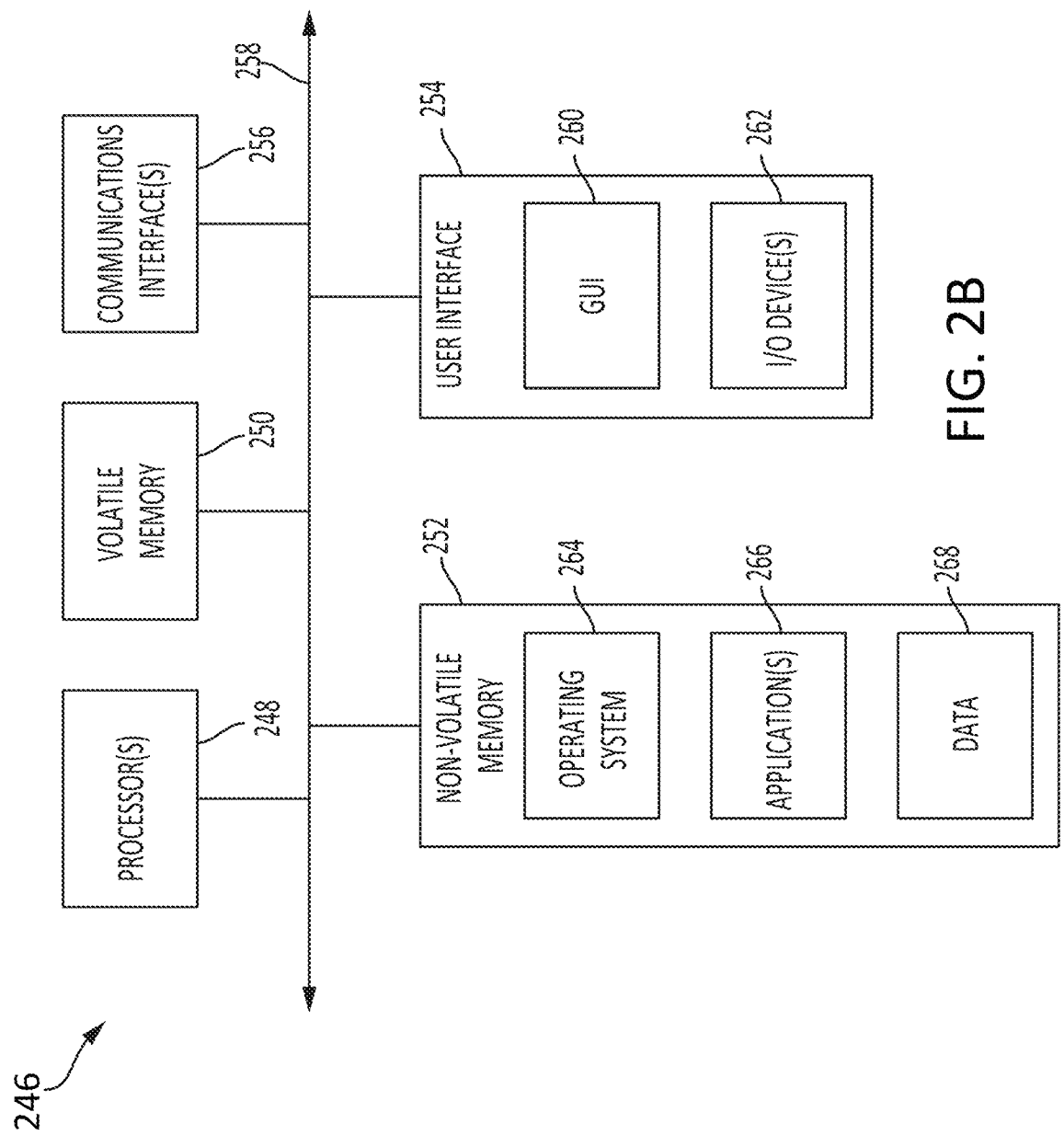
FIG. 2B is a block diagram of a computing system that may be used to implement one or more of the components of the computing environment shown in FIG. 2A in accordance with some embodiments.

FIG. 2B illustrates an example of a computing system 246 that may be used to implement one or more of the respective components (e.g., the clients 202, the servers 204, the appliances 208, 212) within the network environment 200 shown in FIG. 2A. As shown in FIG. 2B, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2B is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
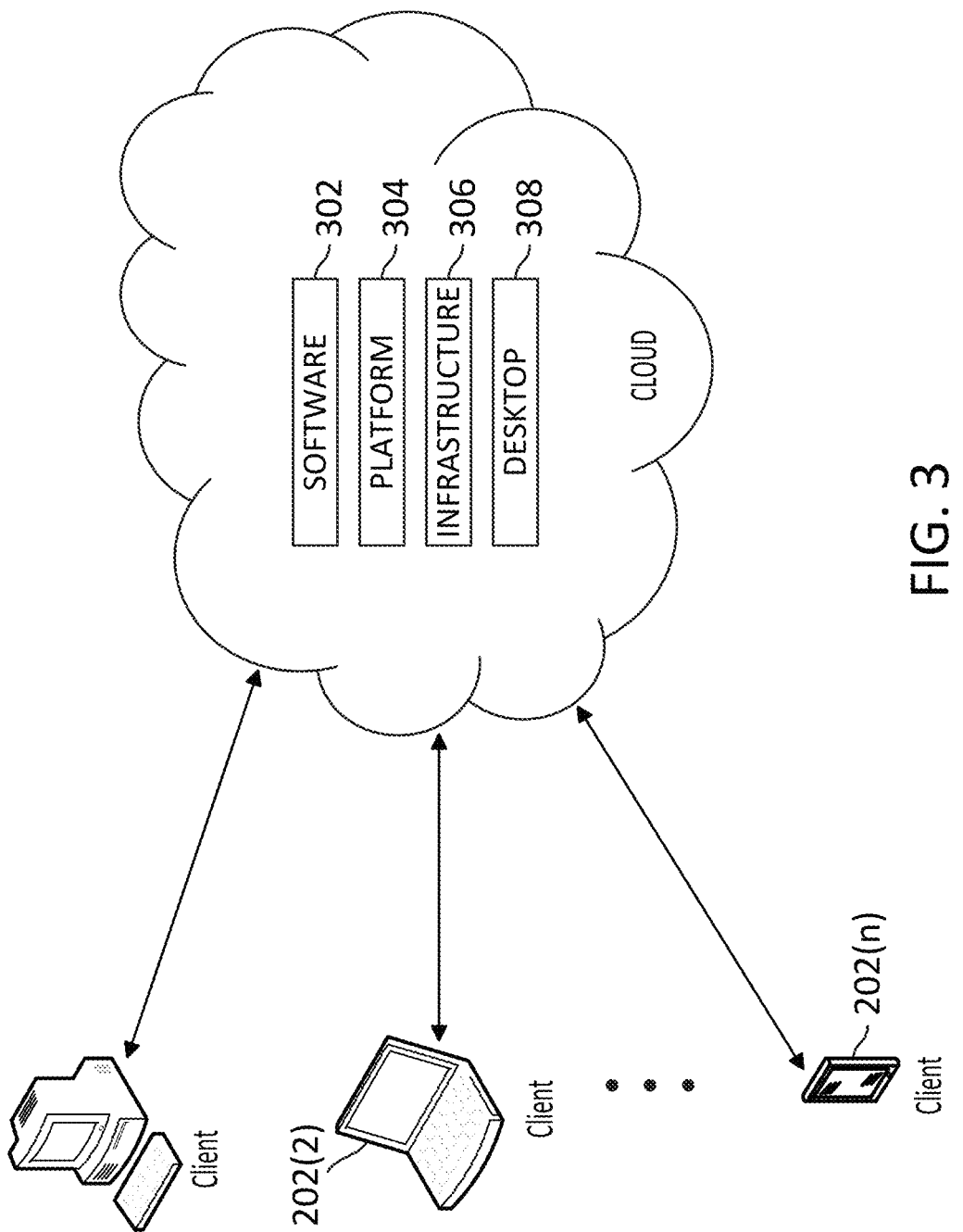
FIG. 3 is a schematic block diagram of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
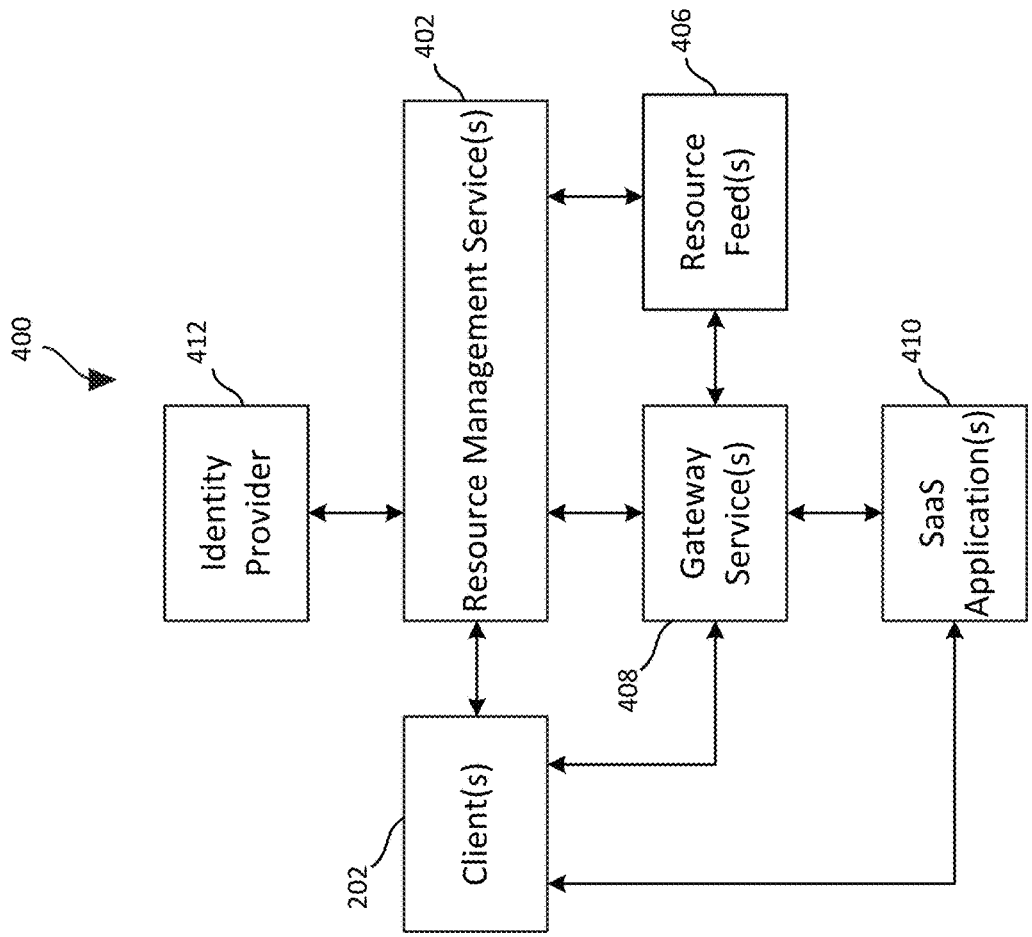
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more interne enabled devices or sensors, etc. The resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
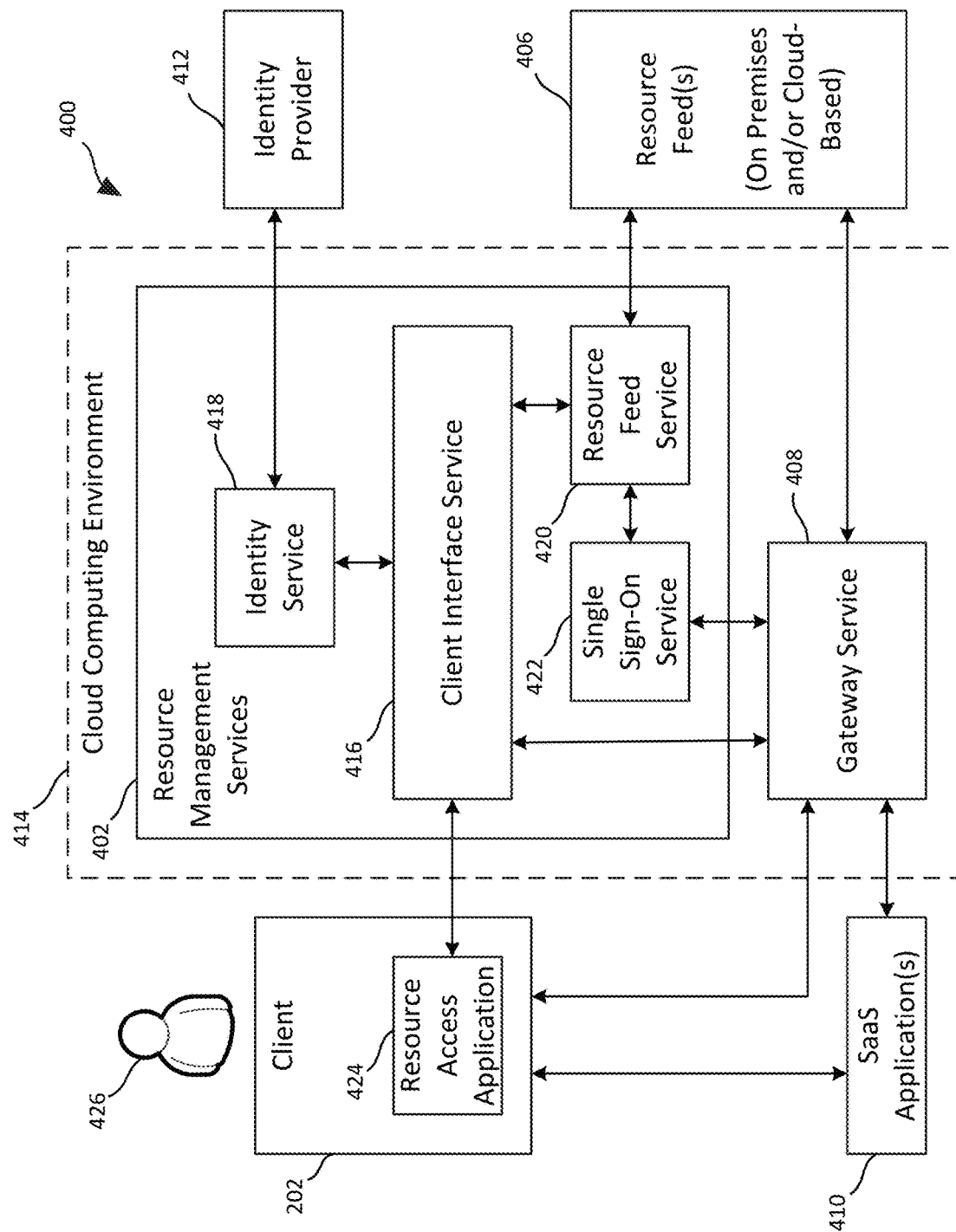
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of the illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

The resource feed service 420 may request identity tokens for configured resources from the single sign-on service 422. The resource feed service 420 may then pass the feed-specific identity tokens it receives to the points of authentication for the respective resource feeds 406. The resource feeds 406 may then respond with lists of resources configured for the respective identities. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more interne enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 to request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
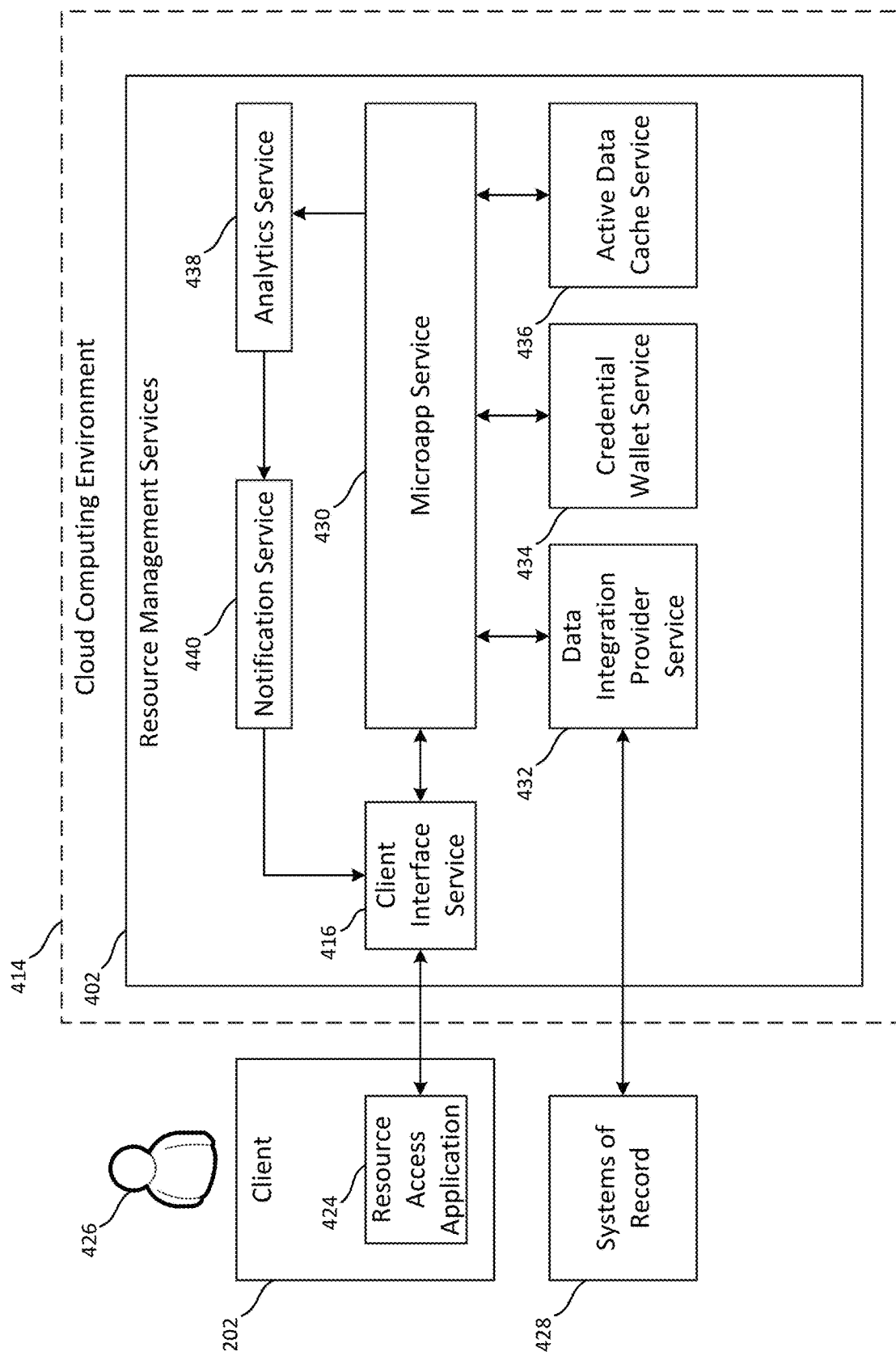
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in an activity feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in an activity feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted OAuth2 token. The data integration provider service 432 may then decrypt the OAuth2 token and write the action to the appropriate system of record under the identity of the user 426. The data integration provider service 432 may then read back changed data from the written-to system of record and send that changed data to the microapp service 430. The microapp service 430 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 424 or directly from another resource, such as Microsoft Teams. This feature may allow employees to work efficiently, stay organized, and deliver only the specific information they're looking for.

Figure 5:
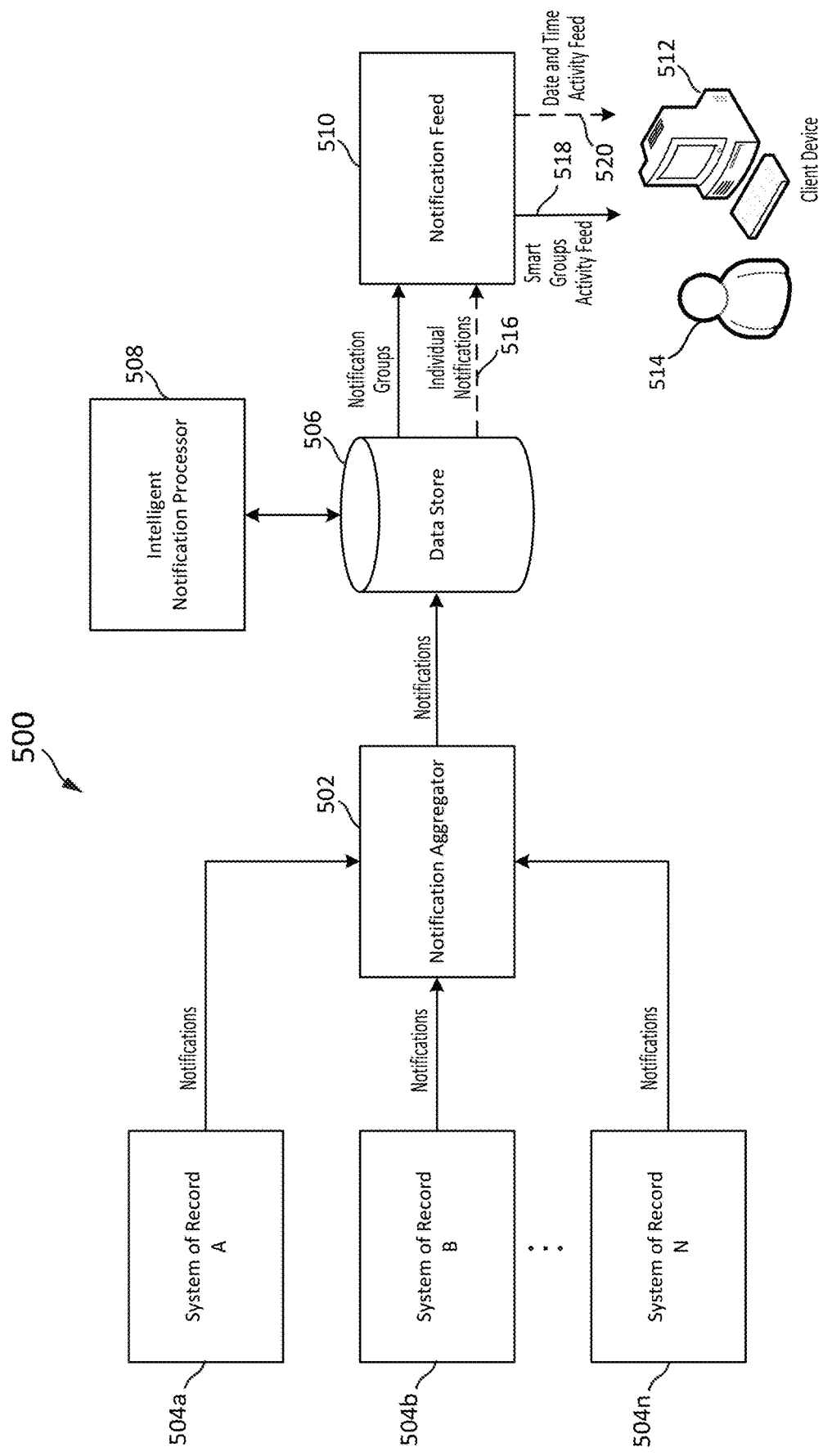
FIG. 5 is a block diagram of an example system for providing intelligent contextual grouping of notifications in accordance with some embodiments of the present disclosure.

E. Detailed Description of Example Embodiments of Systems for Providing Intelligent Contextual Grouping of Notifications in an Activity Feed FIG. 5 is a block diagram of an example system 500 for providing intelligent contextual grouping of notifications as introduced above in Section A in connection with FIGS. 1A-1C. The system 500 may be implemented, for example, using one or more computing systems such as that described above in Section B in connection with FIG. 2B. As shown, the system 500 may include a notification aggregator 502 that may aggregate notifications 106 relating to events that occur on multiple different systems of record 504a-n, e.g., SaaS applications, web applications, Windows applications, Linux applications, desktops, file repositories and/or file sharing systems, etc. The system 500 may also include a data store 506 in which the aggregated notifications 106 may be stored, an intelligent notification processor 508 that may evaluate the aggregated notifications 106 and form notification groups 134 as described herein, and a notification feed 510 that may retrieve notification groups 134 and/or individual notifications 106 from the data store 506 and generate one or more activity feeds 104 such as those described above in connection with FIGS. 1A-C. As can be seen in FIG. 5, the activity feed(s) so generated may be sent from the notification feed 510 to a client device 512 operated by a user 514. In some embodiments, the client device 512 may correspond to any of the clients 202 discussed above, and the remaining components in the system 500 may be implemented using any of the server systems, cloud-based computing environments, or other network and computing environments described herein.

Although FIG. 5 illustrates notifications as flowing directly from the systems of record 504a-n to the notification aggregator 502, it should be appreciated that, in some embodiments, such notifications may instead be generated by one or more intermediate system components that monitor events that occur within the systems of record 504a-n and generate notifications in response to detecting certain such events. The analytics service 438 described above in connection with FIG. 4C is one example of such an intermediate component. In particular, as noted above, in some embodiments, the microapp service 430 (see FIG. 4C) may periodically pull active data from the systems of record 428 (via the data integration provider service 432), and may send raw events, pulled from the systems of record 428, to the analytics service 438 for processing. As also noted above, the analytics service 438 may process the raw events received from the microapp service 430 to create targeted scored notifications and send such notifications to the notification service 440 for processing, which processing may include storing the notifications in a database so they can later be served in an activity feed. Accordingly, in some implementations, the notification aggregator 502, the data store 506, the intelligent notification processor 508, and the notification feed 510 may be included within or operate in conjunction with the notification service 440 described above in connection with FIG. 4C. As such, the notifications shown as entering the notification aggregator 502 in FIG. 5 may correspond to the targeted scored notifications that are sent from the analytics service 438 to the notification service 440, as described above.

In some embodiments, upon determining that two or more notifications are to be assigned to the same notification group 134, the intelligent notification processor 508 may store a group identifier in association with such notifications 106 to indicate that they belong to a particular notification group 134. As explained in more detail below, such group identifiers may subsequently be used by the notification feed 510 to retrieve entire groups of notifications 106 for inclusion in a smart groups activity feed 518 that is sent to the client device 512, e.g., when the "smart groups" option is selected using the user interface element 132 (as shown in FIGS. 1B and 1C). As indicated by the dashed arrow 516 in FIG. 5, the notification feed 510 may also optionally retrieve individual notifications 106 from the data store 506 for inclusion in a date and time activity feed 520, e.g., when the "date and time" option is selected using the user interface element 132 (as shown in FIG. 1A).

Figure 6:
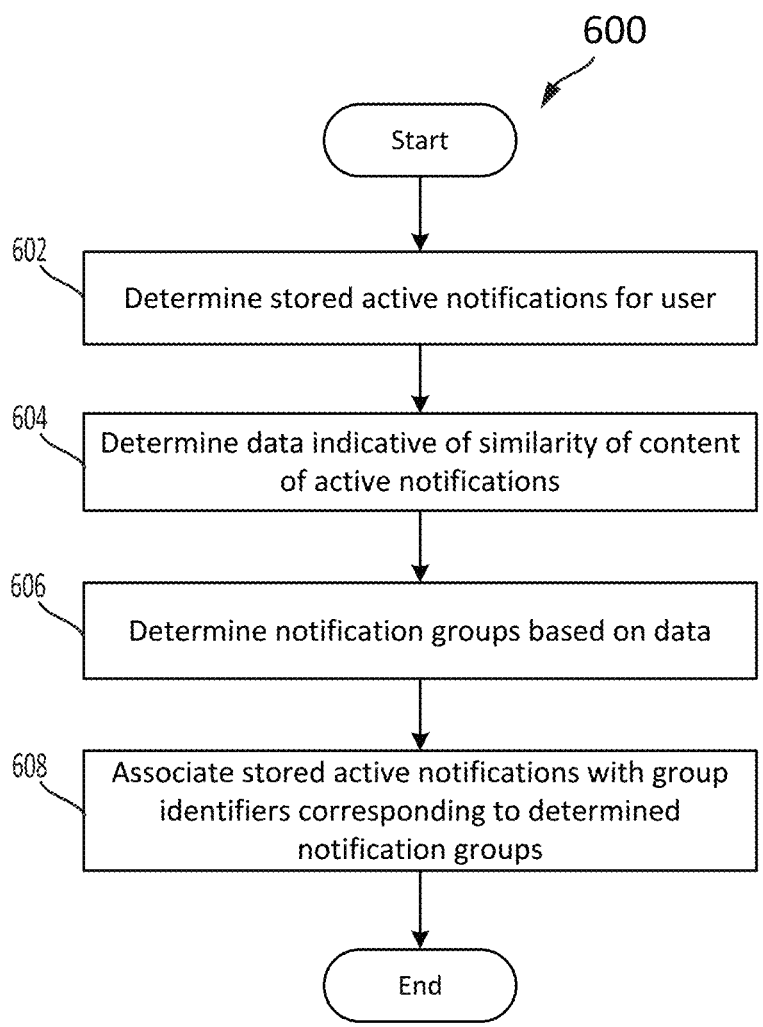
FIG. 6 is a flowchart showing an example routine that may be executed by the intelligent notification processor shown in FIG. 5 in accordance with some embodiments of the present disclosure.
Figure 7B:
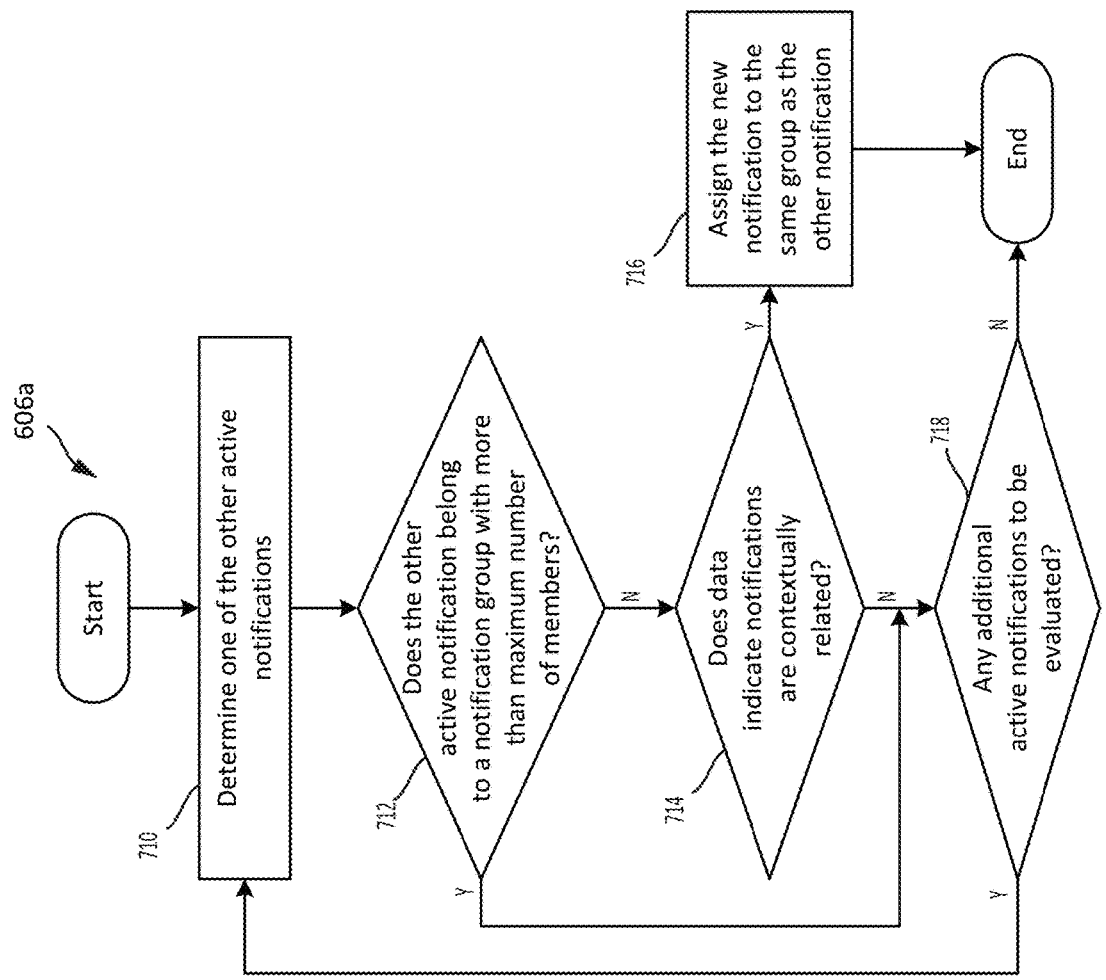
FIG. 7B is a flow chart showing a first example implementations of another of the steps of the routine shown in FIG. 6.
Figure 7A:
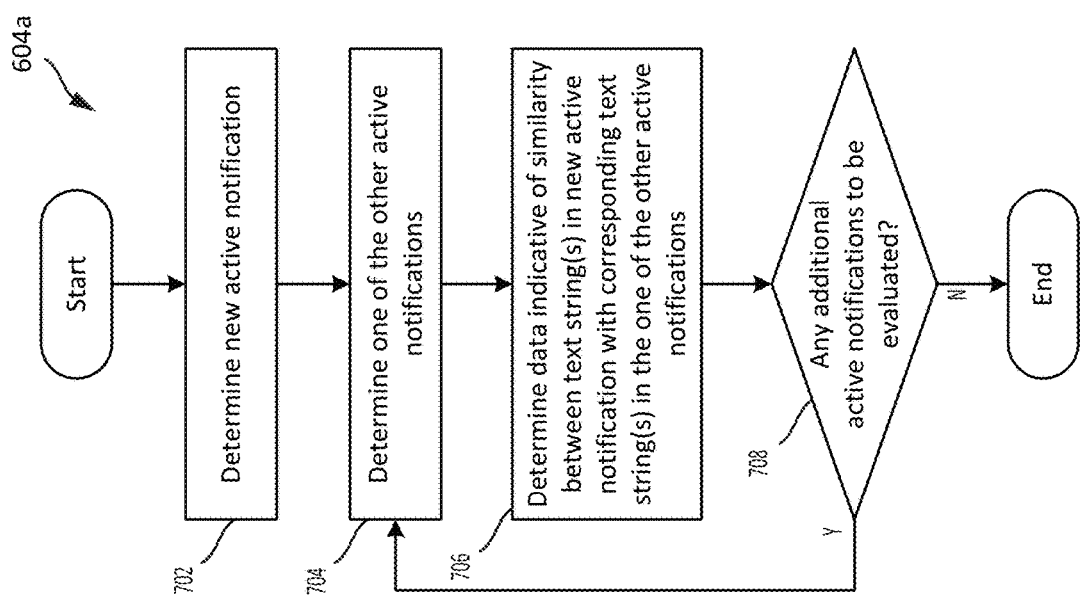
FIG. 7A is a flow chart showing a first example implementations of one of the steps of the routine shown in FIG. 6.
Figure 9:
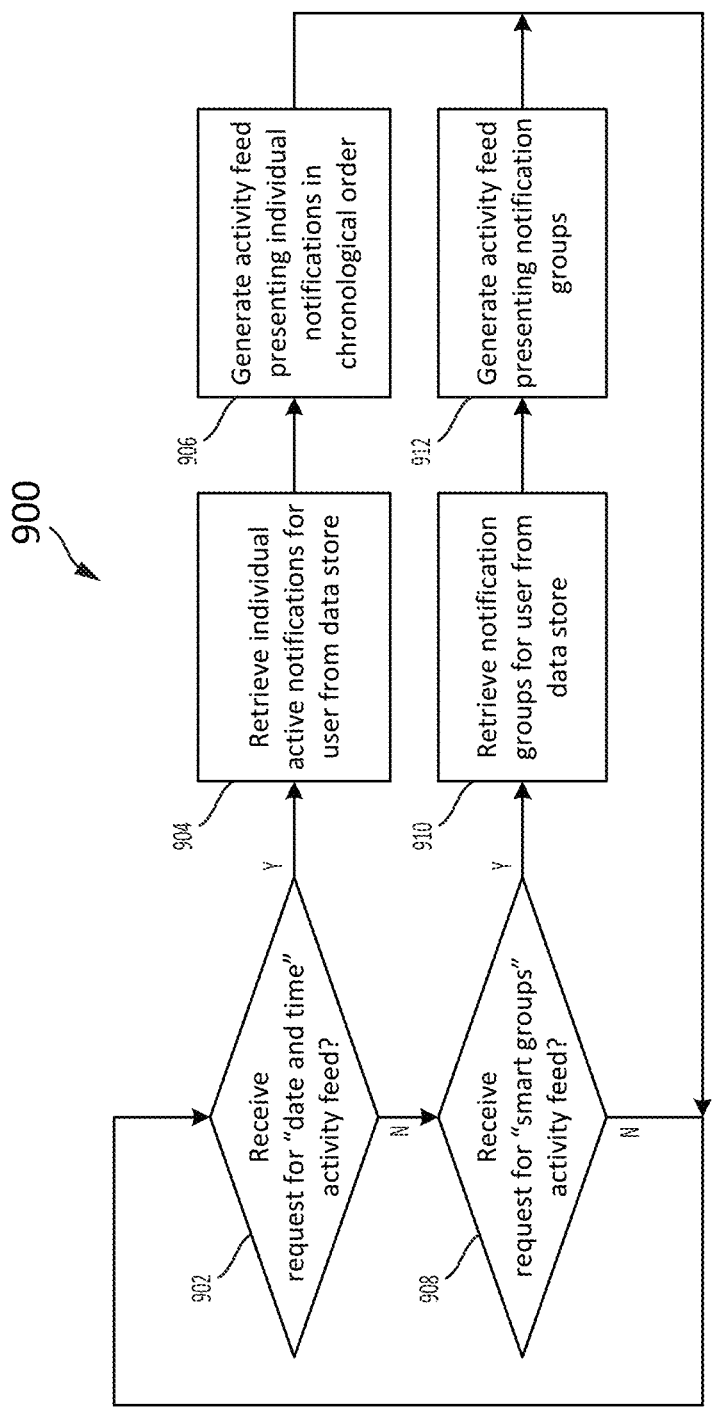
FIG. 9 is a flowchart showing an example routine that may be performed by the notification feed shown in FIG. 5 in accordance with some embodiments of the present disclosure.

FIG. 6 is a flowchart showing an example routine 600 that may be executed by the intelligent notification processor 508 (shown in FIG. 5) in some embodiments. FIGS. 7A and 7B are flow charts showing first example implementations of steps 604 and 606, respectively, of the routine 600. FIGS. 7A and 7B are flow charts showing second example implementations of the steps 604 and 606, respectively. FIG. 9 is a flowchart showing an example routine 900 that may be performed by the notification feed 510 (shown in FIG. 5) in some embodiments. The various steps of the routines 600 and 900 described herein may be implemented, for example, by one or more processors that execute instructions encoded on one or more computer-readable media. Such processor(s) and computer readable medium(s) may, for example, be included in or operate in conjunction with the notification service 440 described above in connection with FIG. 4C.

As shown in FIG. 6, the routine 600 may begin at a step 602, at which active notifications 106 stored in the data store 506 that are associated with the user 514 operating the client device 512 may be determined. The identity of the user 514 may, for example, be determined when the user 514 provides access credentials (e.g., a user name and password) to the resource management services 402 via a resource access application 424, as described above in connection with FIGS. 4A-C. A notification 106 may be considered "active" when, for example, the user 514 has neither selected an action element 108 nor selected a close element 110 associated with that notification.

At a step 604 of the routine 600, the intelligent notification processor 508 may evaluate the content of the active notifications 106 determined at the step 602 to determine data that is indicative of the similarity of such content. At a step 606 of the routine 600, notification groups 134 may be determined based on the data determined at the step 604. The data determined at the step 604 and evaluated at the step 606 may take on any of numerous forms and may be generated and evaluated in any of a number of ways. As explained below in connection with FIGS. 7A and 7B, for example, in some embodiments, such data may indicate a degree of similarity between text strings in pairs of the notifications 106, and notifications 106 that are within a particular range of similarity, e.g., between forty and eighty percent, may be assigned to the same notification group 134. The lower end of such a range may help ensure that notifications 106 having similar content get grouped together. The upper end of the range may help ensure that the same types of notifications 106, e.g., notifications relating to SAP Concur expense reports, do not get grouped together unless they are contextually related, e.g., by being related to the same business trip. Additionally or alternatively, as explained below in connection with FIGS. 8A and 8B, in some embodiments, such data may represent coordinates of data points generated by a machine learning model based on the content of respective notifications 106, and one or more clustering techniques may be used to determine clusters of such data points, with the notifications 106 corresponding to the data points in clusters assigned to the same notification group 134.

At a step 608 of the routine 600, the intelligent notification processor 508 may associate notification group identifiers with the active notifications 106 to identify the notification groups 134 to which such notifications 106 have been assigned. In some implementations, the active notifications 106 may be initially assigned their own unique notification group identifiers, which identifiers may later be superseded or overwritten with the notification group identifiers of other active notifications 106 when a determination is made (e.g., at the step 606) to include such notifications 106 within the same notification group 134. As such, the active notifications 106 may be associated with group identifiers and the notification groups 134 may include one or more notifications 106. The manner in which such group identifiers may be used to retrieve and generate the smart groups activity feed 518, such as that shown in FIGS. 1B and 1C, is described in more detail below in connection with the routine 900 shown in FIG. 9.

FIGS. 7A and 7B illustrate first example routines 604a and 606a that may be used, in some embodiments, to implement steps 604 and 606, respectively, shown in FIG. 6. As shown, at a step 702 of the routine 604a, the intelligent notification processor 508 may determine that a new active notification 106 associated with the user 514 has been or is about to be written to the data store 506. As indicated by decision step 708, the routine 604a may cycle through all of the other previously stored active notifications 106 associated with the user 514 to determine, for such previously-stored active notifications 106 (step 704), data indicative of a similarity between one or more text strings in the new active notification 106 and one or more corresponding text strings in the other active notification (step 706). In some embodiments, for example, one or more fuzzy string matching techniques may be used to compare the titles 120 and/or the bodies 122 of such notifications. One example of a software tool that may be used for this purpose is "Fuzzy Sharp," available at www.nuget.org at the path/packages/BoomTown.Fuzzy Sharp/. When employed, the FuzzySharp tool may generate a "Fuzzy Ratio" between zero and one hundred for any two text strings that are fed to it. Such Fuzzy Ratios thus represent a determined degree of similarity (also referred to as a "similarity percentage") between a pair of input text strings. In some implementations, a first similarity percentage may be determined for a pair of titles 120 and a second similarity percentage may be determined for the corresponding pair of bodies 122, and the two similarity percentages may be combined to yield an overall value for use in determining whether two active notifications 106 are to be assigned to the same notification group 134. In some embodiments, for example, the two similarity percentages may be averaged to yield an overall similarity percentage for the pair of active notifications 106 being evaluated.

As a result of the routine 604a, for the active notifications 106 in the data store 506 that are associated with the user 514, respective data values (e.g., similarity percentages) may be determined that indicate the degree of similarity between that notification 106 and the other active notifications 106 that are associated with the user 514.

As noted above, routine 606a shown in FIG. 7B represents a first example implementation of the step 606 shown in FIG. 6. As will be explained, the routine 606a may determine whether the newly-received notification determined at the step 702 of the routine 604a is to be assigned to the same notification group 134 as one or more other active notifications 106 associated with the user 514. The routine 606a may be performed, for example, whenever the routine 604a finishes determining similarity data values for a newly-received active notification.

As shown in FIG. 7B, by way of decision step 718, the intelligent notification processor 508 may cycle through the other active notifications 106 in the data store 506 that are associated with the user 514 (step 710) to determine whether the newly-received active notification 106 is to be assigned to the same notification group as another active notification associated with the user 514 (step 716). As indicated by decision step 712, in some embodiments, the newly-received notification 106 will not be assigned to a notification group 134 if that notification group 134 already contains more than a threshold number of member notifications 106. Setting such a maximum number of notifications 106 per notification group 134 may improve the usefulness of the system by preventing certain notification groups 134 from overwhelming the smart groups activity feed 518.

At a decision step 714, the intelligent notification processor 508 may evaluate the data determined at the step 706 of the routine 604a to determine whether the newly-received notification 106 is contextually related to the other notification currently under scrutiny (per step 710). In some embodiments, this determination may involve determining whether the overall similarity percentage calculated for text strings in the two notifications is within a particular range of percentages or above a threshold. In some embodiments, for example, two notifications 106 may be determined to be contextually similar if their overall similarity percentage is between forty and eighty percent. As noted above, the lower end of such a range may help ensure that notifications 106 having similar content get grouped together, whereas the upper end of such a range may help ensure that the same types of notifications 106, e.g., notifications relating to SAP Concur expense reports, do not always get grouped together.

In some embodiments, the times at which the two active notifications 106 were generated may also be taken into account when determining whether the notifications 106 are contextually related. In some embodiments, for instance, two notifications 106 may not be assigned to the same notification group 134 when it is determined that the two notifications were generated more than one week apart from one another. Additionally or alternatively, in some embodiments, a weighting factor may be determined that depends on an amount of time between the generation of two notifications 106, which weighting factor may then be used to adjust the similarity percentage before determining whether it falls within the desired range. For instance, when two notifications 106 are generated within one day of each other, a first weighting factor may be applied to the similarity percentage, whereas when two notifications are generated between one day and three days, a second weighting factor may be applied, and so on. Additionally or alternatively, a time-dependent weighting factor may be used to adjust one or both of the threshold values used to determine whether the two notifications 106 are contextually related.

When, at the decision step 714, it is determined that the newly-received notification 106 is contextually related to the active notification currently being evaluated (per step 710), the routine 606a may proceed to a step 716 at which the newly-received notification 106 may be assigned to the same notification group as the other notification. As noted above, in some embodiments, such an assignment may involve assigning the newly-received notification 106 the same notification group identifier as the other notification.

FIGS. 8A and 8B illustrate second example routines 604b and 606b that may be used, in some embodiments, to implement steps 604 and 606, respectively, shown in FIG. 6. Referring first to the routine 604b, the intelligent notification processor 508 may (at a step 802) convert the active notifications 106 associated with the user 514 into respective data vectors that can be processed by a machine learning model. Then, at a step 804, the intelligent notification processor 508 may use the machine learning model to process such data vectors to determine coordinates of data points (in two or more dimensions) for the active notifications 106 corresponding to such data vectors. Any of a number of techniques can be used to generate the data vectors at the step 802 so that such vectors represent features of the respective notifications 106 that are useful in ascertaining whether such notifications 106 are contextually related. Such techniques may, for example, generate data vectors that represent and/or take into account features such as proper names included in the notification's title 120 and/or body 122, verbs and/or verb phrases included in the notification's title 120 and/or body 122, the system of record to which the notification 106 relates (e.g., using application name 126 or other metadata), the types of action elements 108 presented in the notification 106, the creation date of the notification, etc.

Referring next to the routine 606b, at a step 806, the intelligent notification processor 508 may execute one or more clustering processes on the data points generated by the routine 604b to determine clusters of such data points. Then, at a step 808, the notifications 106 that correspond to the data points in the identified clusters may be assigned to common notification groups, e.g., by assigning them the same notification group identifier. Any of a number of clustering techniques may be used to identify groups of data points. In various embodiments, for example, the clustering process may employ centroid-based clustering, density-based clustering, distribution-based clustering, and/or hierarchical clustering.

In some implementations, the machine learning model used to process the data vectors at the step 804 of the routine 604b may operate in conjunction with the clustering process employed at the step 806 of the routine 606b. The machine learning model may be initially trained using a training data set that includes data vectors for a large number of notifications 106 as well as data identifying the groups of such notifications that are deemed to be contextually related.

Further, after the machine learning model has been initially trained, feedback from users may be employed to refine the model. For example, in some embodiments, when presented with smart groups activity feeds 518, users may be provided with an option to "ungroup" a notification group or selectively add or remove one or more notifications to or from a group. In some embodiments, in response to detecting such actions, the machine learning model may be retrained using the data vectors that generated the supposedly erroneous grouping as well as the modified grouping information indicated by the user.

FIG. 9 shows an example implementation of a routine 900 that may be employed by the notification feed 510 shown in FIG. 5. As shown, at a decision step 902, a determination may be made as to whether the user 514 has requested the date and time activity feed 520 (e.g., via the resource access application 424 shown in FIG. 4C), As indicated, when a request for the date and time activity feed 520 is received, the routine 900 may proceed to a step 904, at which individual active notifications 106 may be retrieved from the data store 506 for inclusion in the date and time activity feed 520. At a step 906, the notification feed 510 may cause the retrieved active notifications 106 to be presented on a display screen of the client device 512 (e.g., via the resource access application 424 shown in FIG. 4C) in chronological order (or, optionally, in reverse chronological order).

At a decision step 908, a determination may be made as to whether the user 514 has requested the smart groups activity feed 518 (e.g., via the resource access application 424 shown in FIG. 4C). As indicated, when a request for the smart groups activity feed 518 is received, the routine 900 may proceed to a step 910, at which notification groups 134 may be retrieved from the data store 506 for inclusion in the smart groups activity feed 518. At a step 912, the notification feed 510 may cause the retrieved notification groups to be presented on the display screen of the client device 512 (e.g., via the resource access application 424 shown in FIG. 4C). In some embodiments, the retrieved notification groups 134 may be presented in chronological (or, optionally, reverse-chronological) order based on the earliest-created (or, optionally, latest-created) notifications in the respective notification groups 134.

F. Example Implementations of Methods, Systems, and Computer-Readable Media in Accordance with the Present Disclosure The following paragraphs (M1) through (M15) describe examples of methods that may be implemented in accordance with the present disclosure.

(M1) A computing system may perform a method that involves determining that resource activity notifications are to be sent to a client device operated by a user, the resource activity notifications including at least a first notification and a second notification, the first notification including a first user interface element corresponding to a first action to be taken with respect to a first resource, and the second notification including a second user interface element corresponding to a second action to be taken with respect to a second resource, the second resource being different than the first resource; determining, based on content of the resource activity notifications, that a first subset of the resource activity notifications are contextually related, the first subset including at least the first notification and the second notification; and providing the first subset of the resource activity notifications to the client device as a first group, the provision of the first subset of the resource activity notifications enabling the user to operate a user interface of the client device to select the first user interface element to take the first action and to select the second user interface element to take the second action.

(M2) A computing system may perform the method described in paragraph (M1), wherein the method may further involve causing the client device to present, on a display screen of the client device, at least one first feature indicative of the first group including the first notification and the second notification.

(M3) A computing system may perform the method described in paragraph (M1) or paragraph (M2), wherein the resource activity notifications may further include a third notification including a third user interface element corresponding to a third action to be taken with respect to the first resource, and the method may further involve determining, based on the content of the resource activity notifications, that a second subset of the resource activity notifications are contextually related, the second subset including at least the third notification; and providing the second subset of the resource activity notifications to the client device as a second group, the provision of the second subset of the resource activity notifications enabling the user to operate the user interface to select the third user interface element to take the third action.

(M4) A computing system may perform the method described in paragraph (M3), wherein the method may further involve causing the client device to present, on a display screen of the client device, at least one first feature indicative of the first group including the first notification and the second notification; and causing the client device to present, on the display screen, at least one second feature indicative of the second group including the third notification (M5) A computing system may perform the method described in paragraph (M4), wherein the at least one first feature may include a first graphical element associated with first text of the first notification and second text of the second notification, and the at least one second feature may include a second graphical element associated with third text of the third notification.

(M6) A computing system may perform the method described in paragraph (M5), wherein the first graphical element may surround the first text and the second text and the second graphical element may surround the third text.

(M7) A computing system may perform the method described in any of paragraphs (M3) through (M6), wherein the method may further involve causing the client device to present the first notification, the second notification, and the third notification concurrently on the display screen.

(M8) A computing system may perform the method described in any of paragraphs (M1) through (M7), wherein the computing system may determine that the resource activity notifications are to be sent to the client device at least in part by accessing first account data associated with a first account of the user; determining a change in the first account data; determining, based at least in part on the change in the first account data, that the first notification is to be sent to the client device, wherein the first action relates to the change in the first account data; accessing second account data associated with a second account of the user; determining a change in the second account data; and determining, based at least in part on the change in the second account data, that the second notification is to be sent to the client device, wherein the second action relates to the change in the second account data.

(M9) A computing system may perform the method described in paragraph (M8), wherein the method may further involve using first access credentials of the user to access the first account; and using second access credentials of the user to access the second account.

(M10) A computing system may perform the method described in paragraph (M8) or paragraph (M9), wherein the method may be performed by a first computing system, the first account data may be stored by a second computing system, and the second account data may be stored by a third computing system.

(M11) A computing system may perform the method described in any of paragraphs (M1) through (M10), wherein the computing system may determine that the first subset of the resource activity notifications are contextually related at least in part by determining that the first notification and the second notification both relate to a first set of activities by a first individual relating to a first event.

(M12) A computing system may perform the method described in any of paragraphs (M1) through (M11), wherein the computing system may determine that the first subset of the resource activity notifications are contextually related at least in part by comparing at least one first text string in the first notification to at least one second text string in the second notification; and determining that the at least one first text string and the at least one second text string have greater than a first threshold degree of similarity.

(M13) A computing system may perform the method described in paragraph (M12), wherein the computing system may further determine that the first subset of the resource activity notifications are contextually related at least in part by determining that the at least one first text string and the at least one second text string have less than a second threshold degree of similarity.

(M14) A computing system may perform the method described in any of paragraphs (M1) through (M13), wherein the computing system may determine that the first subset of the resource activity notifications are contextually related at least in part by processing a representation of at least a portion of the first notification with a machine learning model to determine a first output; processing a representation of at least a portion of the second notification with the machine learning model to determine a second output; and evaluating the first output and the second output using a clustering technique to determine that the first output and the second output both correspond to the first group.

(M15) A computing system may perform the method described in any of paragraphs (M1) through (M14), wherein the first notification may be associated with a first time, the second notification may be associated with a second time, and the computing system may further determine that the first subset of the resource activity notifications are contextually related based on the first time and the second time.

The following paragraphs (S1) through (S15) describe examples of systems and devices that may be implemented in accordance with the present disclosure.

(S1) A system may comprise at least one processor, and at least one computer-readable medium encoded with instructions which, when executed by the at least one processor, may cause the system to determine that resource activity notifications are to be sent to a client device operated by a user, the resource activity notifications including at least a first notification and a second notification, the first notification including a first user interface element corresponding to a first action to be taken with respect to a first resource, and the second notification including a second user interface element corresponding to a second action to be taken with respect to a second resource, the second resource being different than the first resource, to determine, based on content of the resource activity notifications, that a first subset of the resource activity notifications are contextually related, the first subset including at least the first notification and the second notification, and to provide the first subset of the resource activity notifications to the client device as a first group, the provision of the first subset of the resource activity notifications enabling the user to operate a user interface of the client device to select the first user interface element to take the first action and to select the second user interface element to take the second action.

(S2) A system may be configured as described in paragraph (S1), and the at least one computer-readable medium may further be encoded with additional instructions which, when executed by the at least one processor, may further cause the system to cause the client device to present, on a display screen of the client device, at least one first feature indicative of the first group including the first notification and the second notification.

(S3) A system may be configured as described in paragraph (S1) or paragraph (S2), wherein the resource activity notifications may further include a third notification including a third user interface element corresponding to a third action to be taken with respect to the first resource, and the at least one computer-readable medium may further be encoded with additional instructions which, when executed by the at least one processor, may further cause the system to determine, based on the content of the resource activity notifications, that a second subset of the resource activity notifications are contextually related, the second subset including at least the third notification, and to provide the second subset of the resource activity notifications to the client device as a second group, the provision of the second subset of the resource activity notifications enabling the user to operate the user interface to select the third user interface element to take the third action.

(S4) A system may be configured as described in paragraph (S3), and the at least one computer-readable medium may further be encoded with additional instructions which, when executed by the at least one processor, may further cause the system to cause the client device to present, on a display screen of the client device, at least one first feature indicative of the first group including the first notification and the second notification, and to cause the client device to present, on the display screen, at least one second feature indicative of the second group including the third notification.

(S5) A system may be configured as described in paragraph (S4), wherein the at least one first feature may include a first graphical element associated with first text of the first notification and second text of the second notification, and the at least one second feature may include a second graphical element associated with third text of the third notification.

(S6) A system may be configured as described in paragraph (S5), wherein the first graphical element may surround the first text and the second text and the second graphical element may surround the third text.

(S7) A system may be configured as described in any of paragraphs (S3) through (S6), and the at least one computer-readable medium may further be encoded with additional instructions which, when executed by the at least one processor, may further cause the system to cause the client device to present the first notification, the second notification, and the third notification concurrently on the display screen.

(S8) A system may be configured as described in any of paragraphs (S1) through (S7), and the at least one computer-readable medium may further be encoded with additional instructions which, when executed by the at least one processor, may further cause the system to determine that the resource activity notifications are to be sent to the client device at least in part by accessing, by the system, first account data associated with a first account of the user; determining, by the system, a first in the first account data; determining, by the system and based at least in part on the change in the first account data, that the first notification is to be sent to the client device, wherein the first action relates to the change in the first account data; accessing, by the system, second account data associated with a second account of the user; determining, by the system, a change in the second account data; and determining, by the system and based at least in part on the change in the second account data, that the second notification is to be sent to the client device, wherein the second action relates to the change in the second account data.

(S9) A system may be configured as described in paragraph (S8), and the at least one computer-readable medium may further be encoded with additional instructions which, when executed by the at least one processor, may further cause the system to use first access credentials of the user to access the first account, and to use second access credentials of the user to access the second account.

(S10) A system may be configured as described in paragraph (S8) or paragraph (S9), wherein the system may comprise a first computing system, the first account data may be stored by a second computing system, and the second account data may be stored by a third computing system.

(S11) A system may be configured as described in any of paragraphs (S1) through (S10), and the at least one computer-readable medium may further be encoded with additional instructions which, when executed by the at least one processor, may further cause the system to determine that the first subset of the resource activity notifications are contextually related at least in part by determining that the first notification and the second notification both relate to a first set of activities by a first individual relating to a first event.

(S12) A system may be configured as described in any of paragraphs (S1) through (S11), and the at least one computer-readable medium may further be encoded with additional instructions which, when executed by the at least one processor, may further cause the system to determine that the first subset of the resource activity notifications are contextually related at least in part by comparing at least one first text string in the first notification to at least one second text string in the second notification, and determining that the at least one first text string and the at least one second text string have greater than a first threshold degree of similarity.

(S13) A system may be configured as described in paragraph (S12), and the at least one computer-readable medium may further be encoded with additional instructions which, when executed by the at least one processor, may further cause the system to further determine that the first subset of the resource activity notifications are contextually related at least in part by determining that the at least one first text string and the at least one second text string have less than a second threshold degree of similarity.

(S14) A system may be configured as described in any of paragraphs (S1) through (S13), and the at least one computer-readable medium may further be encoded with additional instructions which, when executed by the at least one processor, may further cause the system to determine that the first subset of the resource activity notifications are contextually related at least in part by processing a representation of at least a portion of the first notification with a machine learning model to determine a first output, processing a representation of at least a portion of the second notification with the machine learning model to determine a second output, and evaluating the first output and the second output using a clustering technique to determine that the first output and the second output both correspond to the first group.

(S15) A system may be configured as described in any of paragraphs (S1) through (S14), wherein the first notification may be associated with a first time, the second notification may be associated with a second time, and the at least one computer-readable medium may further be encoded with additional instructions which, when executed by the at least one processor, may further cause the system to determine that the first subset of the resource activity notifications are contextually related based on the first time and the second time.

The following paragraphs (CRM1) through (CRM15) describe examples of computer-readable media that may be implemented in accordance with the present disclosure.

(CRM1) At least one non-transitory, computer-readable medium may be encoded with instructions which, when executed by at least one processor included in a computing system, cause the computing system to determine that resource activity notifications are to be sent to a client device operated by a user, the resource activity notifications including at least a first notification and a second notification, the first notification including a first user interface element corresponding to a first action to be taken with respect to a first resource, and the second notification including a second user interface element corresponding to a second action to be taken with respect to a second resource, the second resource being different than the first resource, to determine, based on content of the resource activity notifications, that a first subset of the resource activity notifications are contextually related, the first subset including at least the first notification and the second notification, and to provide the first subset of the resource activity notifications to the client device as a first group, the provision of the first subset of the resource activity notifications enabling the user to operate a user interface of the client device to select the first user interface element to take the first action and to select the second user interface element to take the second action.

(CRM2) At least one computer-readable medium may be configured as described in (CRM1), and may be further encoded with additional instructions which, when executed by the at least one processor, further cause the computing system to cause the client device to present, on a display screen of the client device, at least one first feature indicative of the first group including the first notification and the second notification.

(CRM3) At least one computer-readable medium may be configured as described in paragraph (CRM1) or paragraph (CRM2), wherein the resource activity notifications may further include a third notification including a third user interface element corresponding to a third action to be taken with respect to the first resource, and the at least one computer-readable medium may further be encoded with additional instructions which, when executed by the at least one processor, further cause the computing system to determine, based on the content of the resource activity notifications, that a second subset of the resource activity notifications are contextually related, the second subset including at least the third notification, and to provide the second subset of the resource activity notifications to the client device as a second group, the provision of the second subset of the resource activity notifications enabling the user to operate the user interface to select the third user interface element to take the third action.

(CRM4) At least one computer-readable medium may be configured as described in paragraph (CRM3), and may further be encoded with additional instructions which, when executed by the at least one processor, further cause the computing system to cause the client device to present, on a display screen of the client device, at least one first feature indicative of the first group including the first notification and the second notification, and to cause the client device to present, on the display screen, at least one second feature indicative of the second group including the third notification.

(CRM5) At least one computer-readable medium may be configured as described in paragraph (CRM4), wherein the at least one first feature may include a first graphical element associated with first text of the first notification and second text of the second notification, and the at least one second feature may include a second graphical element associated with third text of the third notification.

(CRM6) At least one computer-readable medium may be configured as described in paragraph (CRM5), wherein the first graphical element may surround the first text and the second text and the second graphical element may surround the third text.

(CRM7) At least one computer-readable medium may be configured as described in any of paragraphs (CRM3) through (CRM6), and may further be encoded with additional instructions which, when executed by the at least one processor, further cause the computing system to cause the client device to present the first notification, the second notification, and the third notification concurrently on the display screen.

(CRM8) At least one computer-readable medium may be configured as described in any of paragraphs (CRM1) through (CRM7), and may further be encoded with additional instructions which, when executed by the at least one processor, further cause the computing system to determine that the resource activity notifications are to be sent to the client device at least in part by accessing, by the computing system, first account data associated with a first account of the user; determining, by the computing system, a change in the first account data; determining, by the computing system and based at least in part on the change in the first account data, that the first notification is to be sent to the client device, wherein the first action relates to the change in the first account data; accessing, by the computing system, second account data associated with a second account of the user; determining, by the computing system, a change in the second account data; and determining, by the computing system and based at least in part on the change in the second account data, that the second notification is to be sent to the client device, wherein the second action relates to the change in the second account data.

(CRM9) At least one computer-readable medium may be configured as described in (CRM8), and may be further encoded with additional instructions which, when executed by the at least one processor, further cause the computing system to use first access credentials of the user to access the first account, and to use second access credentials of the user to access the second account.

(CRM10) At least one computer-readable medium may be configured as described in paragraph (CRM8) or paragraph (CRM9), wherein the computing system may comprise a first computing system, the first account data may be stored by a second computing system, and the second account data may be stored by a third computing system.

(CRM11) At least one computer-readable medium may be configured as described in any of paragraphs (CRM1) through (CRM10), and may further be encoded with additional instructions which, when executed by the at least one processor, further cause the computing system to determine that the first subset of the resource activity notifications are contextually related at least in part by determining that the first notification and the second notification both relate to a first set of activities by a first individual relating to a first event.

(CRM12) At least one computer-readable medium may be configured as described in any of paragraphs (CRM1) through (CRM11), and may further be encoded with additional instructions which, when executed by the at least one processor, further cause the computing system to determine that the first subset of the resource activity notifications are contextually related at least in part by comparing at least one first text string in the first notification to at least one second text string in the second notification, and determining that the at least one first text string and the at least one second text string have greater than a first threshold degree of similarity.

(CRM13) At least one computer-readable medium may be configured as described in (CRM12), and may be further encoded with additional instructions which, when executed by the at least one processor, further cause the computing system to further determine that the first subset of the resource activity notifications are contextually related at least in part by determining that the at least one first text string and the at least one second text string have less than a second threshold degree of similarity.

(CRM14) At least one computer-readable medium may be configured as described in any of paragraphs (CRM1) through (CRM13), and may further be encoded with additional instructions which, when executed by the at least one processor, further cause the computing system to determine that the first subset of the resource activity notifications are contextually related at least in part by processing a representation of at least a portion of the first notification with a machine learning model to determine a first output, processing a representation of at least a portion of the second notification with the machine learning model to determine a second output, and evaluating the first output and the second output using a clustering technique to determine that the first output and the second output both correspond to the first group.

(CRM15) At least one computer-readable medium may be configured as described in any of paragraphs (CRM1) through (CRM14), wherein the first notification may be associated with a first time, the second notification may be associated with a second time, and the at least one computer-readable medium may further be encoded with additional instructions which, when executed by the at least one processor, may further cause the system to determine that the first subset of the resource activity notifications are contextually related based on the first time and the second time.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    determining, by a computing system, that resource activity notifications, including at least a first notification and a second notification, are to be sent to a client device operated by a user at least in part by:
        accessing, by the computing system, first account data associated with a first account of the user,
        determining, by the computing system, a change in the first account data,
        determining, by the computing system and based at least in part on the change in the first account data, that the first notification is to be sent to the client device,
        accessing, by the computing system, second account data associated with a second account of the user, the second account being different than the first account,
        determining, by the computing system, a change in the second account data, and
        determining, by the computing system and based at least in part on the change in the second account data, that the second notification is to be sent to the client device;
    determining, by the computing system and based on content of the resource activity notifications, that a first subset of the resource activity notifications are contextually related, the first subset including at least the first notification and the second notification; and
    providing, by the computing system, the first subset of the resource activity notifications to the client device as a first group.

2. The method of claim 1, further comprising:
    causing the client device to present, on a display screen of the client device, at least one first feature indicative of the first group including the first notification and the second notification.

3. The method of claim 1, further comprising:
    using, by the computing system, first access credentials of the user to access the first account; and
    using, by the computing system, second access credentials of the user to access the second account.

4. The method of claim 1, wherein:
the method is performed by a first computing system;
the first account data is stored by a second computing system; and
the second account data is stored by a third computing system.

5. The method of claim 1, wherein:
the first notification is associated with a first time;
the second notification is associated with a second time; and
the determining that the first subset of the resource activity notifications are contextually related is further based on the first time and the second time.

6. The method of claim 1, wherein:
the first notification includes a first user interface element corresponding to a first action to be taken with respect to the first account;
the first action relates to the change in the first account data;
the second notification includes a second user interface element corresponding to a second action to be taken with respect to the second account;
the second action relates to the change in the second account data; and
the provision of the first subset of the resource activity notifications enables the user to operate a user interface of the client device to select the first user interface element to take the first action and to select the second user interface element to take the second action.

7. A method comprising:
determining, by a computing system, that resource activity notifications are to be sent to a client device operated by a user, the resource activity notifications including at least a first notification and a second notification;
determining, by the computing system and based on content of the resource activity notifications, that a first subset of the resource activity notifications are contextually related, the first subset including at least the first notification and the second notification, wherein determining that the first subset of the resource activity notifications are contextually related includes:
comparing at least one first text string in the first notification to at least one second text string in the second notification,
determining that the at least one first text string and the at least one second text string have greater than a first threshold degree of similarity, and
determining that the at least one first text string and the at least one second text string have less than a second threshold degree of similarity; and
providing, by the computing system, the first subset of the resource activity notifications to the client device as a first group.

8. The method of claim 1, wherein determining that the first subset of the resource activity notifications are contextually related further comprises:
processing a representation of at least a portion of the first notification with a machine learning model to determine a first output;
processing a representation of at least a portion of the second notification with the machine learning model to determine a second output; and
evaluating the first output and the second output using a clustering technique to determine that the first output and the second output both correspond to the first group.

9. The method of claim 7, wherein:
the first notification includes a first user interface element corresponding to a first action to be taken with respect to a first resource;
the second notification includes a second user interface element corresponding to a second action to be taken with respect to a second resource, the second resource being different than the first resource; and
the provision of the first subset of the resource activity notifications enables the user to operate a user interface of the client device to select the first user interface element to take the first action and to select the second user interface element to take the second action.

10. The method of claim 7, wherein:
the first notification is associated with a first time;
the second notification is associated with a second time; and
the determining that the first subset of the resource activity notifications are contextually related is further based on the first time and the second time.

11. A system, comprising:
at least one processor; and
at least one computer-readable medium encoded with instructions which, when executed by the at least one processor, cause the system to:
determine that resource activity notifications are to be sent to a client device operated by a user, the resource activity notifications including at least a first notification indicative of a first event of a first resource, a second notification indicative of a second event of a second resource, and a third notification indicative of a third event of the first resource, the second resource being different than the first resource,
determine, based on content of the resource activity notifications, that a first subset of the resource activity notifications are contextually related, the first subset including at least the first notification and the second notification,
provide the first subset of the resource activity notifications to the client device as a first group,
determine, based on the content of the resource activity notifications, that a second subset of the resource activity notifications are contextually related, the second subset including at least the third notification, and
provide the second subset of the resource activity notifications to the client device as a second group.

12. The system of claim 11, wherein the at least one computer-readable medium is further encoded with additional instructions which, when executed by the at least one processor, further cause the system to:
cause the client device to present, on a display screen of the client device, at least one first feature indicative of the first group including the first notification and the second notification; and
cause the client device to present, on the display screen, at least one second feature indicative of the second group including the third notification.

13. The system of claim 12, wherein the at least one first feature includes a first graphical element associated with first text of the first notification and second text of the second notification, and the at least one second feature includes a second graphical element associated with third text of the third notification.

14. The system of claim 13, wherein the first graphical element surrounds the first text and the second text and the second graphical element surrounds the third text.

15. The system of claim 12, wherein the at least one computer-readable medium is further encoded with additional instructions which, when executed by the at least one processor, further cause the system to:
cause the client device to present the first notification, the second notification, and the third notification concurrently on the display screen.

16. The system of claim 11, wherein the at least one computer-readable medium is further encoded with additional instructions which, when executed by the at least one processor, further cause the system to determine that the first subset of the resource activity notifications are contextually related at least in part by:
comparing at least one first text string in the first notification to at least one second text string in the second notification; and
determining that the at least one first text string and the at least one second text string have greater than a first threshold degree of similarity.

17. The system of claim 16, wherein the at least one computer-readable medium is further encoded with additional instructions which, when executed by the at least one processor, further cause the system to determine that the first subset of the resource activity notifications are contextually related at least in part by:
determining that the at least one first text string and the at least one second text string have less than a second threshold degree of similarity.

18. The system of claim 11, wherein the at least one computer-readable medium is further encoded with additional instructions which, when executed by the at least one processor, further cause the system to determine that the first subset of the resource activity notifications are contextually related at least in part by:
processing a representation of at least a portion of the first notification with a machine learning model to determine a first output;
processing a representation of at least a portion of the second notification with the machine learning model to determine a second output; and
evaluating the first output and the second output using a clustering technique to determine that the first output and the second output both correspond to the first group.

19. The system of claim 11, wherein:
the first notification includes a first user interface element corresponding to a first action to be taken with respect to the first resource;
the second notification includes a second user interface element corresponding to a second action to be taken with respect to the second resource;
the third notification includes a third user interface element corresponding to a third action to be taken with respect to the first resource;
the provision of the first subset of the resource activity notifications enables the user to operate a user interface of the client device to select the first user interface element to take the first action and to select the second user interface element to take the second action; and
the provision of the second subset of the resource activity notifications enables the user to operate the user interface to select the third user interface element to take the third action.

20. A system of claim 11, comprising:
at least one processor; and
at least one computer-readable medium encoded with instructions which, when executed by the at least one processor, cause the system to:
determine that resource activity notifications, including at least a first notification and a second notification, are to be sent to a client device operated by a user at least in part by:
accessing first account data associated with a first account of the user,
determining a change in the first account data,
determining, based at least in part on the change in the first account data, that the first notification is to be sent to the client device,
accessing second account data associated with a second account of the user, the second account being different than the first account,
determining a change in the second account data, and
determining, based at least in part on the change in the second account data, that the second notification is to be sent to the client device;
determine, based on content of the resource activity notifications, that a first subset of the resource activity notifications are contextually related, the first subset including at least the first notification and the second notification; and
provide the first subset of the resource activity notifications to the client device as a first group.

21. The system of claim 20, the at least one computer-readable medium is further encoded with additional instructions which, when executed by the at least one processor, further cause the system to:
use first access credentials of the user to access the first account; and
use second access credentials of the user to access the second account.

22. The system of claim 20, wherein:
the first notification includes a first user interface element corresponding to a first action to be taken with respect to the first account;
the first action relates to the change in the first account data;
the second notification includes a second user interface element corresponding to a second action to be taken with respect to the second account;
the second action relates to the change in the second account data; and
the provision of the first subset of the resource activity notifications enables the user to operate a user interface of the client device to select the first user interface element to take the first action and to select the second user interface element to take the second action.

23. The system of claim 20, wherein the at least one computer-readable medium is further encoded with additional instructions which, when executed by the at least one processor, further cause the system to determine that the first subset of the resource activity notifications are contextually related at least in part by:
comparing at least one first text string in the first notification to at least one second text string in the second notification; and
determining that the at least one first text string and the at least one second text string have greater than a first threshold degree of similarity.

24. The system of claim 23, wherein the at least one computer-readable medium is further encoded with additional instructions which, when executed by the at least one processor, further cause the system to determine that the first subset of the resource activity notifications are contextually related at least in part by:
   determining that the at least one first text string and the at least one second text string have less than a second threshold degree of similarity.

\* \* \* \* \*